(12) United States Patent
Yang et al.

(10) Patent No.: US 11,337,099 B2
(45) Date of Patent: *May 17, 2022

(54) BEAM MEASUREMENT AND REPORTING METHOD, NETWORK SIDE DEVICE AND MOBILE TERMINAL

(71) Applicant: VIVO MOBILE COMMUNICATION CO., LTD., Chang'an DongGuan (CN)

(72) Inventors: Yu Yang, Chang'an DongGuan (CN); Yu Ding, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,026

(22) Filed: Dec. 10, 2020

(65) Prior Publication Data

US 2021/0099904 A1 Apr. 1, 2021

Related U.S. Application Data

(63) Continuation of application No. 16/475,025, filed as application No. PCT/CN2017/117133 on Dec. 19, 2017, now Pat. No. 10,897,721.

(30) Foreign Application Priority Data

Dec. 28, 2016 (CN) .......................... 201611238104.1

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 7/0695* (2013.01);
(Continued)

(58) Field of Classification Search
CPC ..... H04W 24/10; H04W 64/00; H04W 16/28; H04B 7/0617; H04B 7/0695;
(Continued)

(56) References Cited

U.S. PATENT DOCUMENTS

2010/0183084 A1 7/2010 Rietman
2013/0182594 A1 7/2013 Kim et al.
(Continued)

FOREIGN PATENT DOCUMENTS

CN 101682386 A 3/2010
CN 104137437 A 11/2014
(Continued)

OTHER PUBLICATIONS

PCT/CN2017/117133—International Preliminary Report on Patentability, dated Jul. 11, 2019, 6 pages.
(Continued)

*Primary Examiner* — Shailendra Kumar
(74) *Attorney, Agent, or Firm* — Getech Law LLC; Jun Ye

(57) ABSTRACT

A beam measurement and reporting method, and a computer readable storage medium are provided. The method includes: configuring measurement parameters and report parameters for one or more target beam groups, wherein, the measurement parameters include reference signal resources, reference signal resources corresponding to different target beam groups are different, reference signal resources for beams of at least two TRPs in the one or more target beam groups are same; transmitting the measurement parameters and the report parameters to a mobile terminal; controlling beams of the one or more target beam groups to transmit reference signals on reference signal resources corresponding to the beams, wherein the reference signals are used by the mobile terminal to perform beam measurement; receiv-
(Continued)

ing a measurement report including measurement results reported by the mobile terminal based on the report parameters.

18 Claims, 22 Drawing Sheets

(51) Int. Cl.
 *H04B 17/318* (2015.01)
 *H04W 64/00* (2009.01)
 *H04B 7/0452* (2017.01)

(52) U.S. Cl.
 CPC .......... *H04B 17/318* (2015.01); *H04W 64/00* (2013.01); *H04B 7/0452* (2013.01)

(58) Field of Classification Search
 CPC .... H04B 17/318; H04B 7/0452; H04B 7/022; H04B 17/327; H04B 7/0413; H04B 7/088
 See application file for complete search history.

(56) References Cited

U.S. PATENT DOCUMENTS

| | | | |
|---|---|---|---|
| 2014/0198681 A1 | 7/2014 | Jung et al. | |
| 2014/0211731 A1 | 7/2014 | Inoue et al. | |
| 2016/0119910 A1 | 4/2016 | Krzymien et al. | |
| 2016/0344519 A1 | 11/2016 | Lin et al. | |
| 2017/0104517 A1 | 4/2017 | Kakishima et al. | |
| 2017/0142604 A1* | 5/2017 | Reial | H04W 72/042 |
| 2017/0366992 A1* | 12/2017 | Rune | H04B 7/043 |
| 2018/0019855 A1 | 1/2018 | Zhang et al. | |
| 2019/0007844 A1* | 1/2019 | Muller | H04W 4/08 |
| 2019/0075526 A1* | 3/2019 | Nagaraj | H04B 7/0408 |
| 2019/0327629 A1* | 10/2019 | Zhang | H04B 7/0626 |
| 2021/0076448 A1* | 3/2021 | Koskela | H04B 7/0617 |

FOREIGN PATENT DOCUMENTS

| | | |
|---|---|---|
| CN | 104937972 A | 9/2015 |
| CN | 105812035 A | 7/2016 |
| CN | 105846875 A | 8/2016 |
| CN | 105991220 A | 10/2016 |
| CN | 106105073 A | 11/2016 |
| CN | 106169948 A | 11/2016 |
| EP | 2045944 A1 | 4/2009 |

OTHER PUBLICATIONS

PCT/CN2017/117133—Written Opinion and International Search Report, dated Mar. 6, 2018, 9 pages (no English translation).
CN 201611238104.1—First Office Action, dated Jun. 10, 2019, 22 pages. (with English translation).
CN 201611238104.1—Second Office Action, dated Jan. 3, 2020, 22 pages. (with English translation).
Samsung, "Discussion on Network Triggered Beam Reporting", Nov. 14-18, 2016, 4 pages.
Samsung, "Discussion on Beam Grouping", Nov. 14-18, 2016, 4 pages.
ZTE, ZTE Microelectronics, "Beam Management for Control Channel", Nov. 14-18, 2016, 6 pages.
Nokia, Alcatel-Lucent Shanghai Bell, "RRM Requirements Supporting NR Beam Management", Nov. 14-18, 2016, 6 pages.
CN 201611238104.1—Search Report, dated Apr. 15, 2019, 10 pages, (with English translation).

* cited by examiner

BEAM MEASUREMENT AND REPORTING METHOD, NETWORK SIDE DEVICE AND MOBILE TERMINAL

CROSS-REFERENCE TO RELATED APPLICATIONS

This application is a continuation of U.S. application Ser. No. 16/475,025 filed on Jun. 28, 2019, which is a U.S. National Phase Application of a PCT Application No. PCT/CN2017/117133 filed on Dec. 19, 2017, which claims a priority of a Chinese patent application No. 201611238104.1 filed in China on Dec. 28, 2016, the disclosure of which is incorporated herein in its entirety by reference.

TECHNICAL FIELD

The present disclosure relates to a field of communication technology, and in particular, relates to a beam measurement and reporting method, a network side device, and a mobile terminal.

BACKGROUND

Standardized radio access techniques such as Long Term Evolution (LTE)/LTE-Advanced (LTE-A) are established based on a Multiple-Input Multiple-Output (MIMO) technique plus a Orthogonal Frequency Division Multiplexing (OFDM) technique. The MIMO technique utilizes a spatial freedom degree obtainable by a multiple-antenna system, so as to increase a peak rate and a system frequency-spectrum utilization rate.

In a standardization process for the MIMO technique, a dimension of the MIMO technique is increased continuously. In a Release 8 (Rel-8) of the LTE, a four-layer MIMO transmission may be supported at most. In an enhanced MU-MIMO (Multiple-User MIMO) technique in a Rel-9, four downlink data layers may be supported at most in a Transmission Mode (TM)-8 MU-MIMO transmission. In a Rel-10, a transmission capability of a Single-User MIMO (SU-MIMO) is expanded to eight data layers at most.

An industry is pushing the MIMO technique further forward in a direction of three-dimension and larger scales. Currently, a research project of 3D channel modeling has been finished by the 3rd Generation Partnership Project (3GPP), and a research and a standardization work for an eFD-MIMO and a NR MIMO are carried out. It may be foreseen that a MIMO technique of a larger scale and supporting more antenna ports may be introduced in a forthcoming 5G (fifth generation) mobile communication system.

A Massive MIMO technique uses a massive antenna array and may enhance a frequency-band utilization efficiency of a system significantly, and support a larger amount of users to access the system. Therefore, various research organizations take the Massive MIMO as a most prominent physical-layer technique in a next generation mobile communication system.

In the Massive MIMO technique, if a fully-digital array is used, a maximum spatial resolution and an optimum MU-MIMO performance may be achieved. However, such a fully-digital array needs a large quantity of A/D converters and D/A converters and a large number of complete RF-Baseband processing channels. Thus, a heavy burden is imposed on a cost of a device and a baseband processing complexity.

In order to save the cost of the device and the complexity, a digital-analog mixed beam-forming technique is provided and is a technique in which a level of beam-forming processing is added to a RF signal at a front end near an antenna system based on a conventional digital beam-forming processing. An analog beam-forming processing may enable a rough match between a transmission signal and a channel in a simple manner. A dimension of equivalent channels formed after the analog beam-forming processing is smaller than an actual amount of antennas, and thus the amounts of A/D converters and D/A converters needed subsequently, a quantity of digital channels and a baseband processing complexity may be greatly reduced. A residual interference in the analog beam-forming processing may be further processed in a digital domain, and thus a MU-MIMO transmission quality is ensured. Compared with a fully-digital beam-forming technique, the digital-analog mixed beam-forming technique is a trade-off solution between a performance and a complexity, and has a broader application prospect in a system configured with high frequency bands, large bandwidths or a large amount of antennas.

In respect of high frequency bands, in a research on a next generation mobile communication system beyond the fourth generation (4G), operational frequency bands supported by the system are increased to 6 GHz and above, and a highest operational frequency band may be about 100 GHz. Plenty of spare frequency resources may exist at the high frequency bands and may provide a larger throughput for data transmission. Currently, a high-frequency channel modeling has been finished by the 3GPP. A wavelength of a high-frequency signal is short, and more antenna array elements may be arranged on a panel in a high-frequency scene than on a panel of a same size in a low-frequency scene, and beams having a better directivity and a narrower lobe may be formed by using a beamforming technique. A combination of a massive antenna with high-frequency communication is one development direction in future.

In respect of beam measurement and reports, transmission using the analog beamforming is performed at all bands, and analog beams may only be transmitted in a time-division manner by each polarization directional element on each high-frequency antenna array panel. A beamforming weight value of each analog beam is provided by adjusting parameters of devices such as a Radio Frequency (RF) front-end phase shifter.

In current academia and industry, a training for beamforming vectors of the analog beams is performed by means of polling, i.e., training signals (i.e. candidate beamforming vectors) are transmitted sequentially at determined time points in a time-division manner by array elements at each polarization direction of each antenna panel, and a terminal feeds back an optimum training signal after a measurement is performed, so that the network side device may use the optimum training signal for transmitting analog beams in a next service transmission.

In the relevant art, beam trainings are generally independently performed among panels of high-frequency massive antennas or independently performed among Transmission Reception Points (TRPs) at the network side device, and different reference signal resources are used for the trainings, respectively. In a case that an antenna array is massive, a quantity of the panel is large, or an amount of the TRPs is huge, more reference signal resources need to be configured for the trainings, causing a problem of large system overhead.

SUMMARY

Some embodiments of the present disclosure provide a beam measurement and reporting method, a network side device, and a mobile terminal, so as to address a problem that a lot of reference signal resources need to be configured in a beam-training procedure and a system overhead is large.

In a first aspect, a beam measurement and reporting method is provided in the embodiments of the present disclosure, and is applied in a network side device. The method includes: configuring measurement parameters and report parameters corresponding to one or more target beam groups, wherein, the measurement parameters include reference signal resources, each of the one or more target beam groups includes beams of at least two Transmission-Reception Points (TRPs), reference signal resources corresponding to different ones of the one or more target beam groups are different, and reference signal resources corresponding to beams of at least two TRPs in at least one of the one or more target beam groups are same; transmitting the measurement parameters and the report parameters to a mobile terminal, wherein the measurement parameters are used for the mobile terminal to perform measurement configuration, and the report parameters are used for the mobile terminal to perform report configuration; controlling beams of the one or more target beam groups to transmit reference signals on reference signal resources corresponding to the beams, wherein the reference signals are used by the mobile terminal to perform beam measurement; receiving a measurement report comprising measurement results reported by the mobile terminal based on the report parameters.

In a second aspect, a beam measurement and reporting method is further provided in the embodiments of the present disclosure, and is applied in a mobile terminal. The method includes: receiving measurement parameters and report parameters corresponding to one or more target beam groups configured by a network side device, wherein the measurement parameters include reference signal resources, each of the one or more target beam groups includes beams of at least two Transmission-Reception Points (TRPs), reference signal resources corresponding to different ones of the one or more target beam groups are different, and reference signal resources corresponding to beams of at least two TRPs in at least one of the one or more target beam groups are same; performing measurement configuration and report configuration to the one or more target beam groups based on the measurement parameters and the report parameters; measuring receiving powers of the one or more target beam groups based on the measurement parameters; reporting measurement results based on the report parameters.

In a third aspect, a network side device is further provided in the embodiments of the present disclosure, and includes: a first configuration module, configured for configuring measurement parameters and report parameters corresponding to one or more target beam groups, wherein, the measurement parameters include reference signal resources, each of the one or more target beam groups includes beams of at least two Transmission-Reception Points (TRPs), reference signal resources corresponding to different ones of the one or more target beam groups are different, and reference signal resources corresponding to beams of at least two TRPs in at least one of the one or more target beam groups are same; a transmission module, configured for transmitting the measurement parameters and the report parameters to a mobile terminal, wherein the measurement parameters are used for the mobile terminal to perform measurement configuration, and the report parameters are used for the mobile terminal to perform report configuration; a control module, configured for controlling beams of the one or more target beam groups to transmit reference signals on reference signal resources corresponding to the beams, wherein the reference signals are used by the mobile terminal to perform beam measurement; a first reception module, configured for receiving a measurement report including measurement results reported by the mobile terminal based on the report parameters.

In a fourth aspect, a mobile terminal is further provided in the embodiments of the present disclosure and includes: a third reception module, configured for receiving measurement parameters and report parameters corresponding to one or more target beam groups configured by a network side device, wherein the measurement parameters include reference signal resources, each of the one or more target beam groups includes beams of at least two Transmission-Reception Points (TRPs), reference signal resources corresponding to different ones of the one or more target beam groups are different, and reference signal resources corresponding to beams of at least two TRPs in at least one of the one or more target beam groups are same; a third configuration module, configured for performing measurement configuration and report configuration to the one or more target beam groups based on the measurement parameters and the reporting parameters; a measurement module, configured for measuring receiving powers of the one or more target beam groups based on the measurement parameters; a report module, configured for reporting measurement results based on the report parameters.

In a fifth aspect, a network side device is provided in the embodiments of the present disclosure, and includes a processor, a storage, and computer programs stored on the storage and executable by the processor, wherein in a case that the computer programs are executed by the processor, the processor implements steps in the beam measurement and reporting method according to the first aspect.

In a sixth aspect, a mobile terminal is provided in the embodiments of the present disclosure, and includes a processor, a storage, and computer programs stored on the storage and executable by the processor, wherein in a case that the computer programs are executed by the processor, the processor implements steps in the beam measurement and reporting method according to the second aspect.

In a seventh aspect, a computer readable storage medium is provided in the embodiments of the present disclosure, and includes computer programs stored on the computer readable storage medium, wherein in a case that the computer programs are executed by a processor, the processor implements steps in the beam measurement and reporting method according to the first aspect.

In an eighth aspect, a computer readable storage medium is provided in the embodiments of the present disclosure, and includes computer programs stored on the computer readable storage medium, wherein in a case that the computer programs are executed by a processor, the processor implements steps in the beam measurement and reporting method according to the second aspect.

In this way, in the embodiments of the present disclosure, the measurement parameters and the report parameters corresponding to the one or more target beam groups are configured, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to beams of at least two TRPs in at least one of the one or more target beam groups are same; the measurement parameters and the report parameters are transmitted to the mobile terminal, wherein the measurement parameters are used for the mobile terminal to perform the measurement configuration; and the report parameters are used for the mobile terminal to perform the report configuration; beams of the one or more target beam groups are controlled to transmit reference signals on reference signal resources corresponding to the beams, wherein the reference signals are used for the mobile terminal to perform beam measurement; and a measurement report of the measurement results reported by the mobile terminal based on the report parameters is received. Since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant is addressed.

BRIEF DESCRIPTION OF THE DRAWINGS

In order to more clearly illustrate technical solutions of embodiments of the present disclosure, drawings used in description of the embodiments will be briefly discussed hereinafter. Obviously, following figures are only some of the embodiments of the present disclosure, and one skilled in the art can derive other figures based on these figures without paying any creative labor.

DETAILED DESCRIPTION

Technical solutions of embodiments of the present disclosure will be described clearly and briefly hereinafter in combination of the drawings of the embodiments of the present disclosure. Obviously, the described embodiments are a part, rather than all, of the embodiments of the present disclosure. All other embodiments obtained by one skilled in the art without paying any creative labor based on the embodiments of the present disclosure fall into the scope of the present disclosure.

First Embodiment

Figure 1:
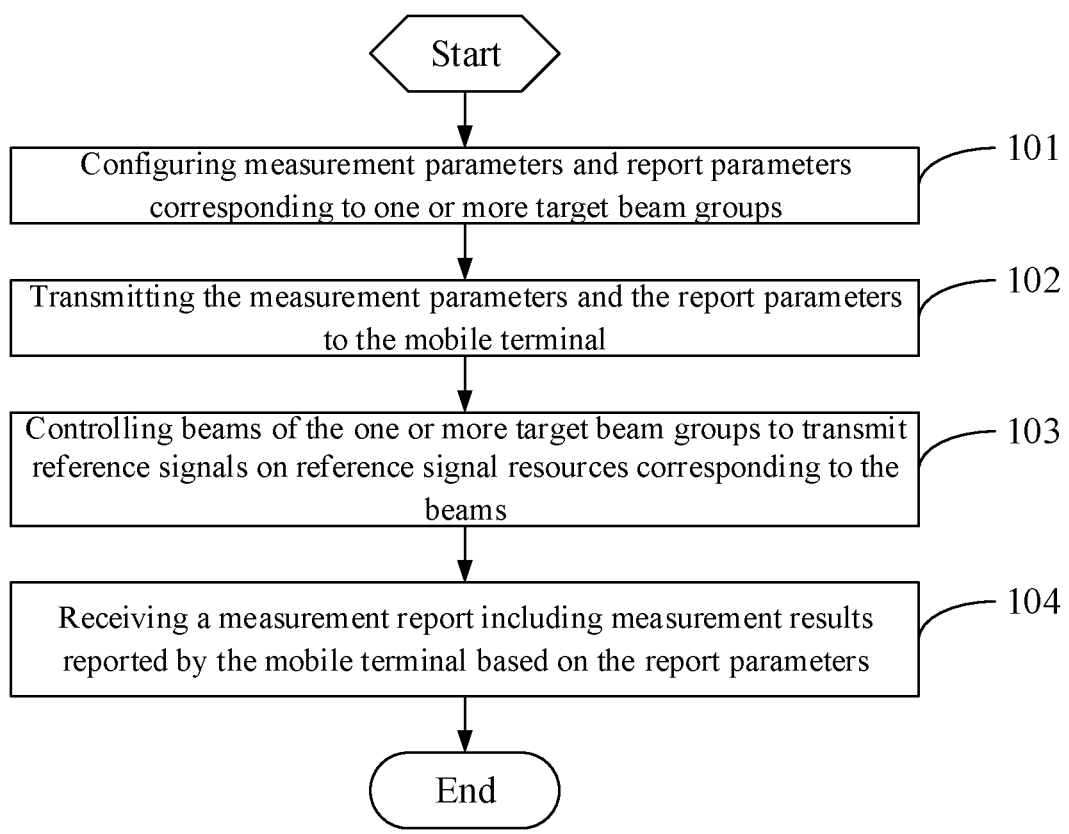
FIG. 1 is a flowchart of a beam measurement and reporting method provided in a first embodiment of the present disclosure.

Referring to FIG. 1, FIG. 1 is a flowchart of a beam measurement and reporting method provided in embodiments of the present disclosure. As shown in FIG. 1, the method includes following steps 101-104.

Step 101: configuring measurement parameters and report parameters corresponding to one or more target beam groups.

The beam measurement and reporting method provided in the embodiment of the present disclosure is mainly applied in a network side device. The measurement parameters include reference signal resources. Each of the one or more target beam groups includes beams of at least two Transmission-Reception Points (TRPs), and reference signal resources corresponding to each of the one or more target beam groups are different from reference signal resources corresponding to another of the one or more target beam groups. Reference signal resources corresponding to beams of at least two TRPs in at least one of the one or more target beam groups are same.

It may be understood that the above network side device (also called a MF access device) may be a base station. It may also be understood that a type of the base station is not limited, and the base station may be a Macro Base Station, a Pico Base Station, a Node B (a name of a 3G base station), an enhanced Node B (eNB), a Home eNode B (a Home eNB or a HeNB) or a Femto eNB, a relay station, an access point, a Remote Radio Unit (RRU), a Remote Radio Head (RRH), and the like.

In this step, the network side device may configure the measurement parameters and report parameters corresponding to the one or more target beam groups for a mobile terminal currently accessing the network side device, so that the mobile terminal may perform measurement and reporting based on the measurement parameters and the report parameters. A rule according to which beams of TRPs are grouped and a target beam group is determined may be configured according to actual requirements and will be described hereinafter in details.

In this embodiment, same reference signal resources may be used for beams in each of the one or more target beam groups, or different reference signal resources may be used for beams in a part of the one or more target beam groups. For example, a first reference signal resource may be used for a part of beams of a target beam group, and a second reference signal resource may be used for another part of beams of the target beam group. However, different reference signal resources may be used for different target beam groups.

Step 102: transmitting the measurement parameters and the report parameters to the mobile terminal.

In this step, the above measurement parameters are used for the mobile terminal to perform measurement configuration, and the report parameters are used for the mobile terminal to perform report configuration.

Specifically, the network side device may transmit, through a preset communication link, the measurement parameters and the report parameters to the mobile terminal having accessed to the network side device. After the mobile terminal receives the measurement parameters and the report parameters, the mobile terminal may perform the measurement configuration based on the measurement parameters and perform the report configuration based on the report parameters.

Step 103: controlling beams of the one or more target beam groups to transmit reference signals on reference signal resources corresponding to the beams.

In this step, the reference signals are used by the mobile terminal to perform beam measurement.

Specifically, in a case that a current time reaches a preconfigured time, the network side device controls each beam to transmit, at the reference signal resource corresponding to the each beam, a reference signal used for measurement, so that the mobile terminal may determine a receiving power, such as a Reference Signal Receiving Power (RSRP), of the each beam based on the reference signal, so that the receiving power of each target beam group may be obtained based on the receiving power of each beam. Additionally, in a case that a preset triggering condition is satisfied, each beam may be controlled to transmit the reference signal at the reference signal resource corresponding to the each beam.

Step 104: receiving a measurement report including measurement results reported by the mobile terminal based on the report parameters.

In this step, the mobile terminal may report measurement results of various target beam groups. Specifically, the mobile terminal may only report measurement results of first N target beam groups having largest receiving powers, i.e., the mobile terminal generates the measurement report based on the measurement results of the first N target beam groups having the largest receiving powers and the report parameters, and reports the measurement report to the network side device to which the mobile terminal has accessed.

In this way, in the embodiments of the present disclosure, the measurement parameters and the report parameters corresponding to the one or more target beam groups are configured, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to beams of at least two TRPs in at least one of the one or more target beam groups are same; the measurement parameters and the report parameters are transmitted to the mobile terminal, wherein the measurement parameters are used for the mobile terminal to perform the measurement configuration; and the report parameters are used for the mobile terminal to perform the report configuration; beams of the one or more target beam groups are controlled to transmit reference signals on reference signal resources corresponding to the beams, wherein the reference signals are used for the mobile terminal to perform beam measurement; and a measurement report of the measurement results reported by the mobile terminal based on the report parameters is received. Since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant is addressed.

Second Embodiment

Figure 2:
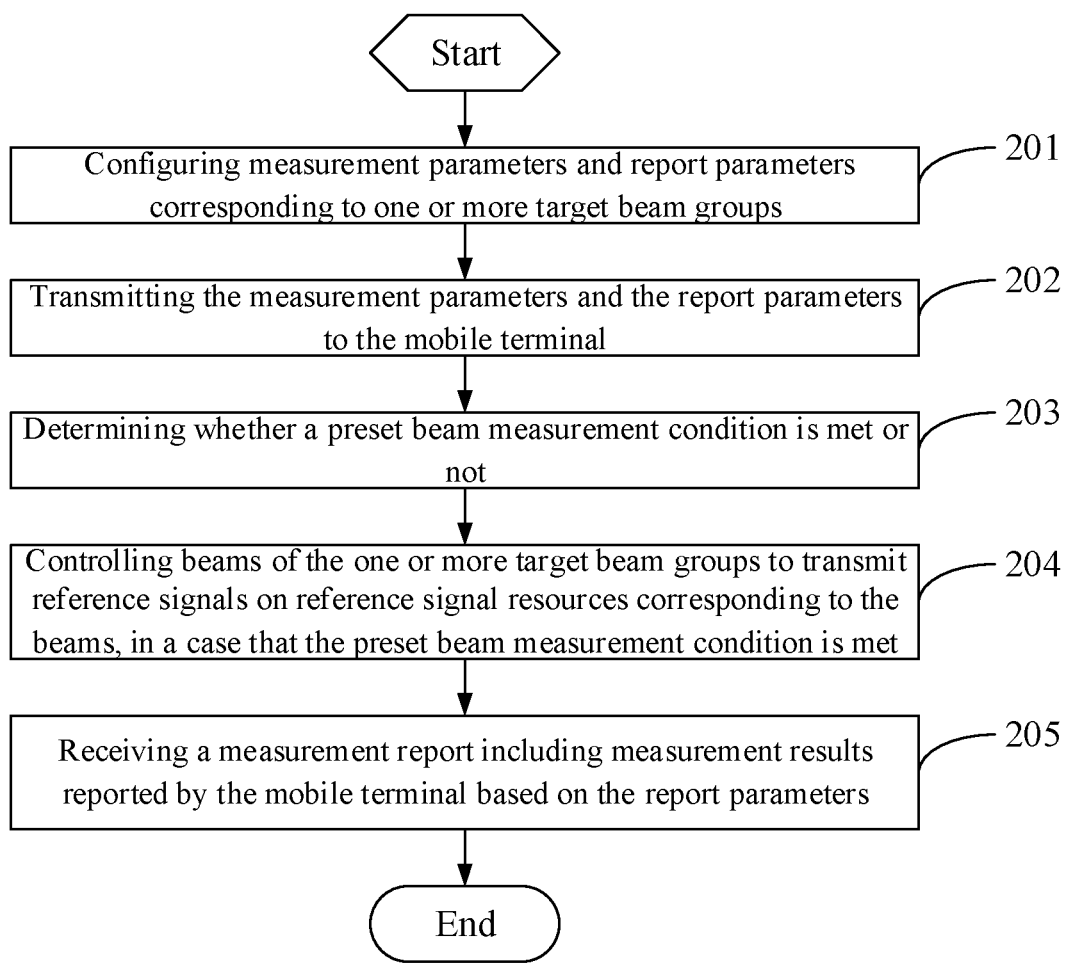
FIG. 2 is a first flowchart of a beam measurement and reporting method provided in a second embodiment of the present disclosure.

Referring to FIG. 2, FIG. 2 is a flowchart of a beam measurement and reporting method provided in the embodiments of the present disclosure. As shown in FIG. 2, the method includes following steps 201-205.

Step 201: configuring measurement parameters and report parameters corresponding to one or more target beam groups.

The beam measurement and reporting method provided in the embodiment of the present disclosure is mainly applied in a network side device. The measurement parameters include reference signal resources. Each of the one or more target beam groups includes beams of at least two Transmission-Reception Points (TRPs), and reference signal resources corresponding to a target beam group are different from reference signal resources corresponding to another target beam group. Reference signal resources corresponding to beams of at least two TRPs in at least one of the one or more target beam groups are same.

It may be understood that the above network side device (also called a MF access device) may be a base station. It may also be understood that a type of the base station is not limited, and the base station may be a Macro Base Station, a Pico Base Station, a Node B (a name of a 3G base station), an enhanced Node B (eNB), a Home eNode B (a Home eNB or a HeNB or a Femto eNB), a relay station, an access point, a Remote Radio Unit (RRU), a Remote Radio Head (RRH), and the like.

In this step, the network side device may configure the measurement parameters and the report parameters corresponding to the target beam group for a mobile terminal currently accessing the network side device, so that the mobile terminal may perform measurement and reporting based on the measurement parameters and the report parameters. A rule according to which beams of TRPs are grouped and the target beam group is determined may be configured according to actual requirements and will be described hereinafter in details.

In this embodiment, same reference signal resources may be used for beams of each target beam group, or different reference signal resources may be used for beams in a part of the one or more target beam groups. For example, a first reference signal resource may be used for a part of beams of a target beam group, and a second reference signal resource may be used for another part of beams of the target beam group. However, different reference signal resources may be used for different target beam groups.

Step 202: transmitting the measurement parameters and the report parameters to the mobile terminal.

In this step, the above measurement parameters are used for the mobile terminal to perform the measurement configuration, and the report parameters are used for the mobile terminal to perform the reporting measurement.

Specifically, the network side device may transmit, through a preset communication link, the measurement parameters and the report parameters to the mobile terminal having accessed to the network side device. After the mobile terminal receives the measurement parameters and the report parameters, the mobile terminal may perform the measurement configuration based on the measurement parameters and perform the report configuration based on the report parameters.

Step 203: determining whether a preset beam measurement condition is met or not.

In this step, the preset beam measurement condition includes at least one of: a condition that a quality deterioration of a communication link of a mobile terminal is monitored by the network side device, a condition that a notification transmitted by the mobile terminal in case of the quality deterioration of the communication link of the mobile terminal monitored by the mobile terminal is received, or a condition that a current time reaches a preset beam measurement period.

In this embodiment, the training may be periodic or aperiodic. A manner in which the quality deterioration of the communication link of the mobile terminal is monitored may be configured according to actual requirements. For example, the network side device may actively monitor the quality of the communication link of the mobile terminal, or the mobile terminal may also monitor the quality of the communication link, and in a case that the mobile terminal monitors that the quality of the communication link deteriorates, the mobile terminal may transmit the notification to the network side device to announce that the quality of the communication link between the mobile terminal and the network side device deteriorates. Specifically, the mobile terminal may directly transmit, to the network side device, a quality data of the communication link being monitored as the notification, and the network side device may determine whether to perform a beam-training procedure or not. The mobile terminal may also transmit, to the network side device, a monitoring result of the quality of the communication link being monitored and the network side device may perform the beam-training procedure after the network side device receives the notification.

Step 204: controlling beams of the one or more target beam groups to transmit reference signals on reference signal resources corresponding to the beams, in a case that the preset beam measurement condition is met.

In this step, the reference signals are used by the mobile terminal to perform beam measurement.

Specifically, in a case that a current time reaches a preconfigured time, the network side device controls each beam to transmit, at the reference signal resource corresponding to the each beam, a reference signal used for measurement, so that the mobile terminal may determine a receiving power of the each beam based on the reference signal, and a receiving power of each target beam may be obtained based on the receiving power of each beam. Additionally, in a case that a preset triggering condition is satisfied, each beam may be controlled to transmit the reference signal at the reference signal resource corresponding to the each beam.

Step 205: receiving a measurement report about a measurement result reported by the mobile terminal based on the report parameters.

In this step, the mobile terminal may report measurement results of various target beam groups. Specifically, the mobile terminal may only report the measurement results of first N target beam groups having largest receiving powers, i.e., the mobile terminal generates the measurement report based on the measurement results of the first N target beam groups having the largest receiving powers and the report parameters, and reports the measurement report to the network side device to which the mobile terminal has accessed.

In this way, in the embodiments of the present disclosure, the measurement parameters and the report parameters corresponding to the one or more target beam groups are configured, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to the beams of the at least two TRPs in at least one of the one or more target beam groups are same; the measurement parameters and the report parameters are transmitted to the mobile terminal, wherein the measurement parameters are used for the mobile terminal to perform the measurement configuration; and the report parameters are used for the mobile terminal to perform the report configuration; whether the preset beam measurement condition is met or not is determined; in a case that the preset beam measurement condition is met, beams of the one or more target beam groups are controlled to transmit reference signals on reference signal resources corresponding to the beams, wherein the reference signals are used for the mobile terminal to perform beam measurement; and a measurement report of the measurement results reported by the mobile terminal based on the report parameters is received. Since the beams to be measured are grouped and configured, and at least two reference signal resources in at least one of the one or more target beam groups are same, a quantity of reference signal resources allocated in the beam-training procedure may be reduced, and a system overhead may be reduced, and a problem that the system overhead is large and the quantity of reference signal resources allocated in the beam-training procedure of is significant is addressed.

Optionally, all beams in each of the one or more target beam groups use same reference signal resources.

Specifically, in this embodiment of the present disclosure, since only the receiving powers of the one or more target beam groups are needed at the time of reporting, same reference signal resources may be used for all beams in each of the one or more target beam groups. In this way, the quantity of reference signal resources used in the beam-training procedure may be reduced to a maximum extent. For example, in a case that N target beam groups are trained, only N reference signal resources may be used for the beam-training procedure.

In a case that all beams in each of the one or more target beam groups use same reference signal resources, the step 204 includes: controlling all beams in each of the one or more target beam groups to transmit the reference signals at the reference signal resource corresponding to the all beams simultaneously.

In this embodiment, each of the one or more target beam groups may transmit the reference signals simultaneously or transmit the reference signals recurrently in the time-division manner. In a case that a quantity of the one or more target beam groups is small, reference signals for all beams in all of the one or more target beam groups may be transmitted simultaneously on reference signal resources corresponding to the all beams, so that a training for the all beams may be finished in one beam-training procedure, and a length for training the beams is reduced.

It should be understood that the all beams of the one or more target beam groups belong to beams of at least two TRPs of a same network side device, or the all beams of the one or more target beam groups belong to beams of at least two TRPs of different network side devices.

Figure 3:
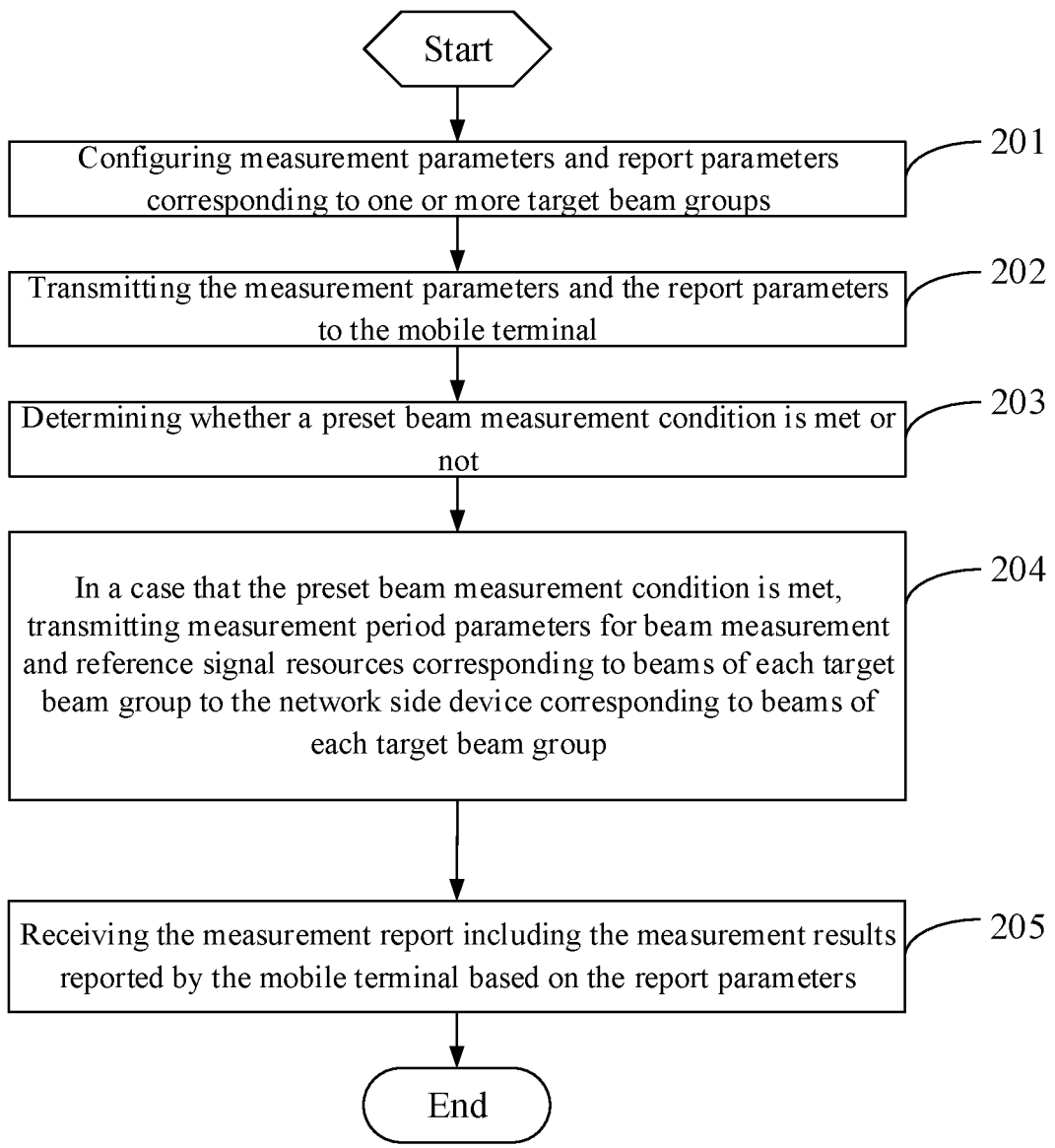
FIG. 3 is a second flowchart of a beam measurement and reporting method provided in a second embodiment of the present disclosure.

It should be noted that in a case that the all beams of the one or more target beam groups belong to the beams of at least two TRPs of different network side devices, when the beams are controlled to transmit the reference signals, other network side devices need to be notified of transmission on the reference signal resources. Specifically, referring to FIG. 3, the controlling beams of the one or more target beam groups to transmit reference signals on reference signal resources corresponding to beams of the one or more target beam groups, includes: transmitting, to the network side device corresponding to beams of each target beam group, measurement period parameters for beam measurement and reference signal resources corresponding to beams of each target beam group, wherein the measurement period parameters are used to control the network side device corresponding to the beams of each target beam group to transmit the reference signals on the reference signal resources corresponding to the beams.

In this embodiment, the measurement period parameters may be a period time of one-time measurement or a periodic time of multiple-time measurements, and may be configured according to actual requirements. For example, in a case that the beam training is aperiodic, the network side device to which the mobile terminal has accessed may, together with other network side devices, transmit reference signals on reference signal resources corresponding to the beams, when the quality of the communication link of the mobile terminal is monitored to deteriorate. Specifically, the measurement period parameters may time points at which the network side devices are triggered to transmit reference signals. For example, the reference signals may be set to be transmitted at a specific time point, or may be directly transmitted after the notification is received by the network side devices.

Further, the measurement parameters may also include the measurement period parameters for the beam measurement and/or group identifiers of the one or more target beam groups. In this embodiment, the measurement period parameters include period values, time offset values, and durations of measurements. Different time offset values mean that the beam measurements are performed for different target beam groups at different period time points. Since the beam measurements may be configured to be performed for different target beam groups at different period time points by configuring different time offset values, flexibility and an application range of the beam measurements may be increased, for example, the time-division manner may be implemented.

Optionally, an association relation is configured between the group identifiers and the reference signal resources corresponding to the one or more target beam groups. The association relation is used by the mobile terminal to determine a target beam group to be measured, based on the reference signal resources.

In this embodiment, the group identifiers may be used to establish the association relation with the target beam groups. In such a case, the network side device may directly transmit group identifiers to the mobile terminal to inform the mobile terminal of the beam groups to be measured; the network side device may also transmit reference signal resources only, and the mobile terminal may indirectly obtain the beam groups to be measured based on the reference signal resources. In this embodiment, the report parameters include parameters of target beam groups.

In a case that the measurement parameters include group identifiers of target beam groups, the parameters of the target beam groups include the group identifiers of the target beam groups and receiving powers corresponding to the target beam groups.

In a case that the measurement parameters do not include a group identifier of a target beam group, the parameters of the target beam groups include receiving powers on reference signal resources corresponding to the target beam groups.

Since in this embodiment, the association relation is established between the group identifiers and the target beam groups, a beam group to be measured by the mobile terminal may be indicated based on the group identifier or reference signal resources, and thus an operational flexibility is increased.

Optionally, in this embodiment, the report parameters may further include reporting period parameters and/or a timing relation between beam reporting and beam measurement, wherein the timing relation is used by the mobile terminal to perform the beam reporting after a preset time interval since the beam measurement is performed.

In this embodiment, the mobile terminal may periodically perform the beam reporting, or non-periodically perform the beam reporting (i.e., the beam reporting may be controlled based on the timing relation). For example, in a case that the beam reporting is performed based on the timing relation, the beam reporting may be performed after a time interval since the beam measurement is performed.

Further, a beam grouping rule may be configured according to actual requirements and will be described in details hereinafter through examples.

Figure 4:
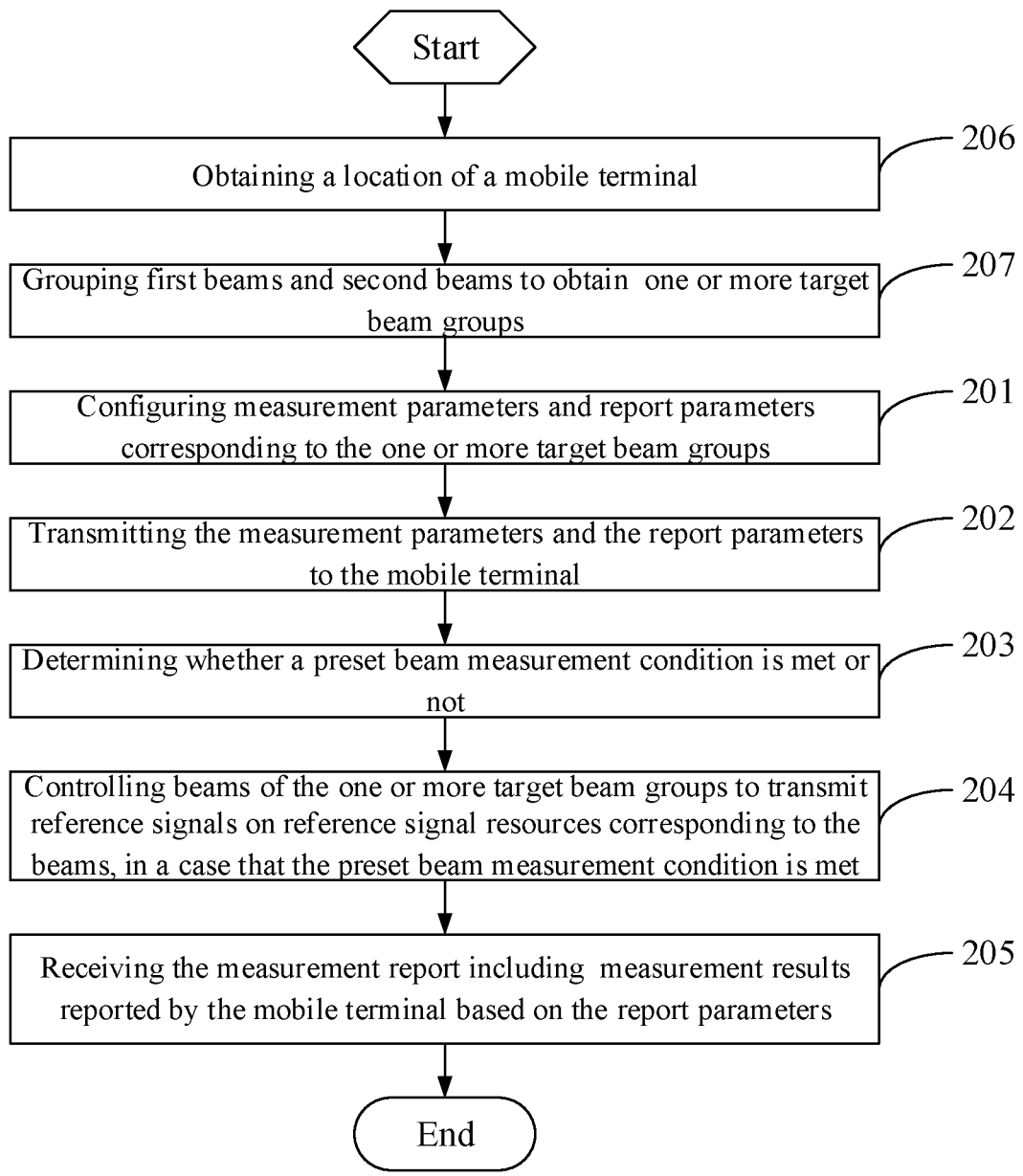
FIG. 4 is a third flowchart of a beam measurement and reporting method provided in a second embodiment of the present disclosure.

Referring to FIG. 4, before performing the step 201, the method further includes a step 206 and a step 207.

Step 206: obtaining a location of the mobile terminal.

In this example, the obtaining the location of the mobile terminal may be configured according to actual requirements. For example, a location reported by the mobile terminal according to a preset period may be received; or a location reported by the mobile terminal according to a preset triggering condition may be received; or a location of the mobile terminal may be obtained through measuring a positioning reference signal.

Step 207: grouping first beams and second beams to obtain the one or more target beam groups, wherein the first beams are beams pointing to the location of the mobile terminal from at least one TRP, and the second beams are beams adjacent to directions directed by the first beams.

For example, a beam in a direction directing from TRP1 to the position of the mobile terminal is beam 11, and beams in directions adjacent to the direction are beam 12 and beam 13. Similarly, a beam in a direction directing from TRP2 to the position of the mobile terminal is beam 21, and beams in directions adjacent to the direction are beam 22 and beam 23. Then, a beam grouping result for the TRP1 and the TRP2 performed by the base station is that a first target beam group includes (beam 11, beam 21), a second target beam group includes (beam 12, beam 22), a third target beam group includes (beam 13, beam 23). The base station may allocate different reference signal resources to different target beam groups, and beams in each of the target beam groups use same reference signal resources, so that a beam-training procedure for the mobile terminal may be performed.

In this embodiment, since beam groups may be established independently for the mobile terminal based on the position of the mobile terminal, a search range for the beam groups may be reduced and a beam-training speed may be increased.

Figure 5:
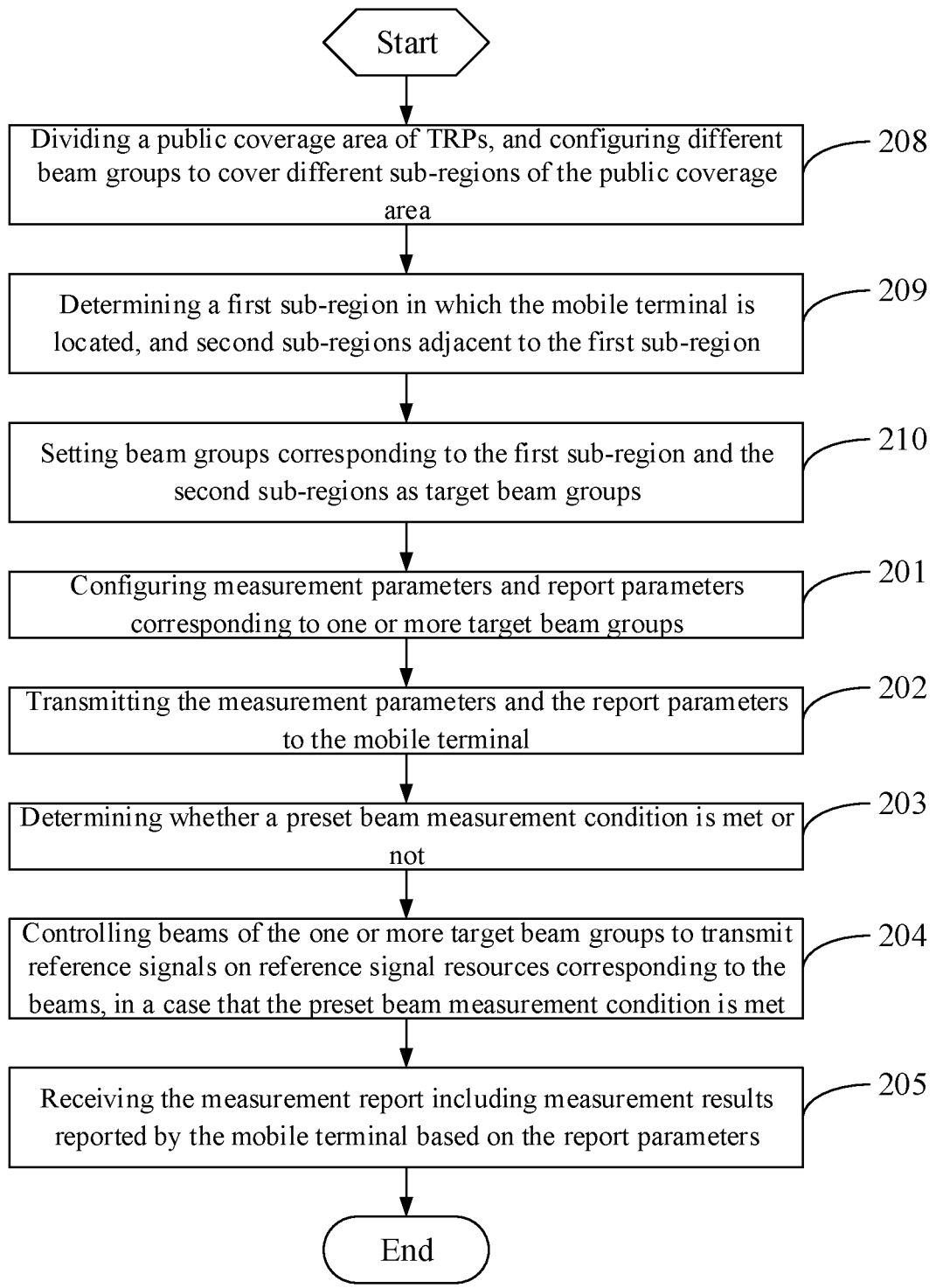
FIG. 5 is a fourth flowchart of a beam measurement and reporting method provided in a second embodiment of the present disclosure.

Optionally, a grouping relation for beam groups may also be established in advance, and then a beam group to be trained may be determined based on a location of the mobile terminal. Specifically, referring to FIG. 5, in the embodiment, before the above step 201, the method further includes steps 208-210.

Step 208: dividing a public coverage area of TRPs, and configuring different beam groups to cover different sub-regions of the public coverage area.

Figure 6:
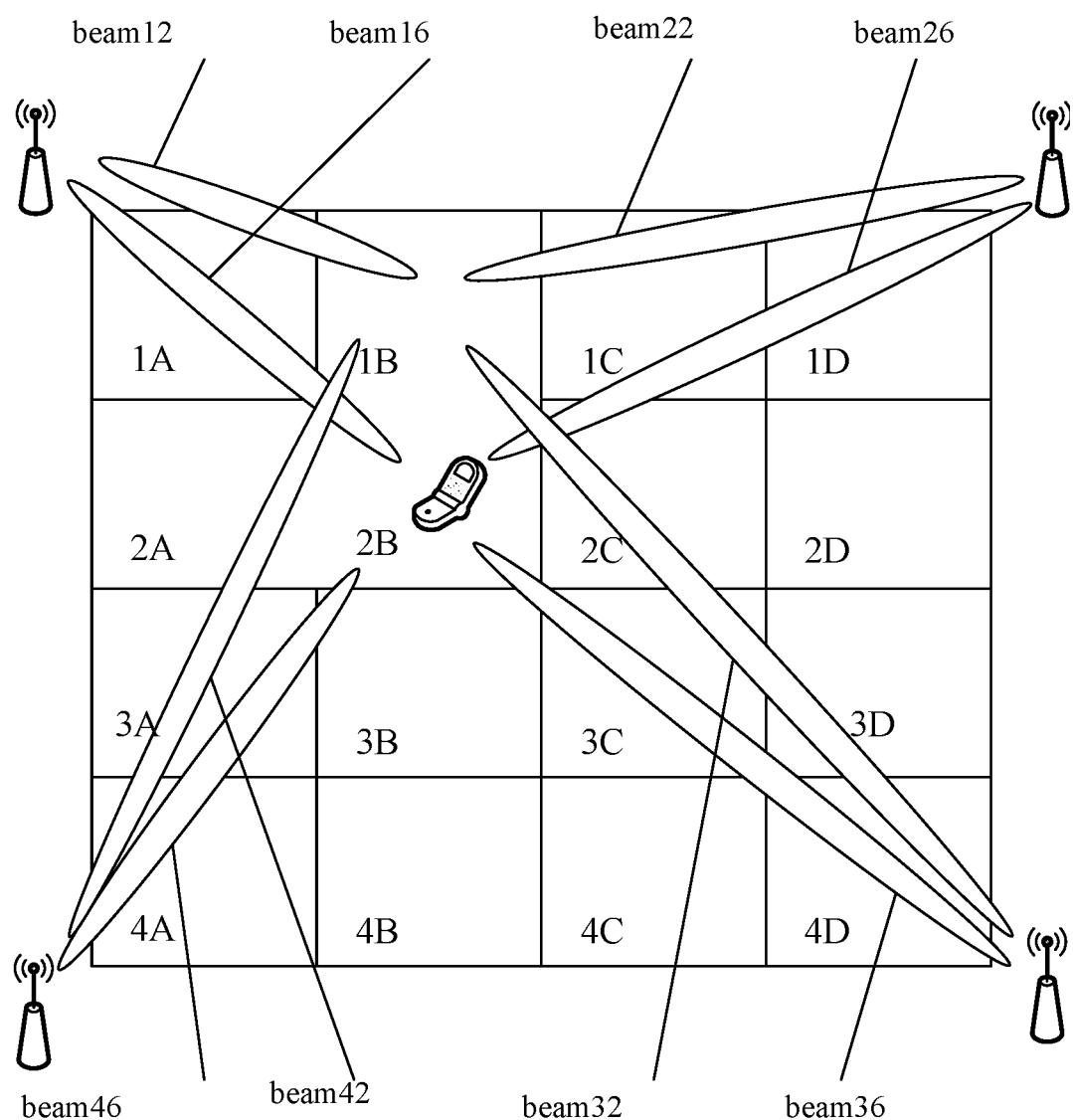
FIG. 6 is a schematic diagram of a structure obtained after dividing a public coverage area of Transmission-Reception Points, according to the beam measurement and reporting method provided in the second embodiment of the present disclosure.

As shown in FIG. 6, in a case that four TRPs may collectively cover a grid area including 1A-4D. Further, it may be set in advance that each beam group may cover a sub-region in this public grid area. For example, the beam 12, the beam 22, a beam 32, and a beam 42 covers a sub-region 1B; a beam 16, a beam 26, a beam 36, and a beam 46 covers a sub-region 2B; and same principle applies to remaining sub-regions.

In the embodiment, the public coverage area of the TRPs means a public coverage area formed by multiple TRPs. Optionally, the multiple TRPs mean TRPs in a same cell.

Step 209: determining a first sub-region in which the mobile terminal is located, and second sub-regions adjacent to the first sub-region.

In the step, the location of the mobile terminal may be obtained firstly, and then a first sub-region in which the mobile terminal is located, and second sub-regions adjacent to the first sub-region may be determined based on the location. For example, in a case that the mobile terminal is located in a sub-region 2B, second sub-regions adjacent to the sub-region 2B are a sub-region 1B, a sub-region 2A, a sub-region 3B and a sub-region 2C.

Step 210: setting beam groups corresponding to the first sub-region and the second sub-regions as target beam groups.

When a beam-training procedure is performed for the mobile terminal, beam groups corresponding to sub-regions 2B, 1B, 2A, 3B, and 2C are set as target beam groups in the beam-training procedure.

Figure 7:
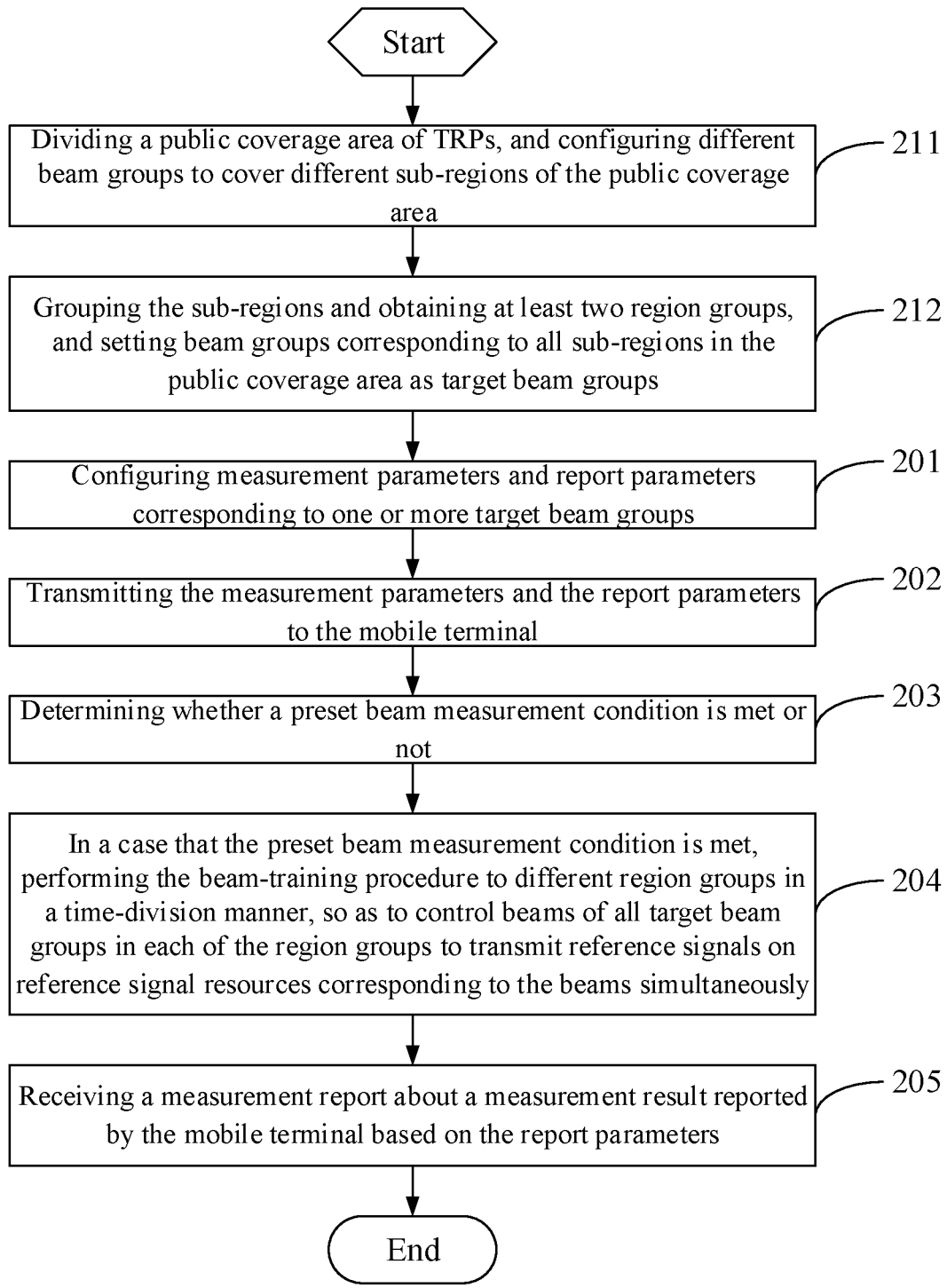
FIG. 7 is a fifth flowchart of a beam measurement and reporting method provided in a second embodiment of the present disclosure.

Optionally, referring to FIG. 7, a cell may also be set as a target in the beam-training procedure in the present disclosure. In this embodiment, before the above step 201, the method further includes steps 211-212.

Step 211: dividing a public coverage area of TRPs, and configuring different beam groups to cover different sub-regions of the public coverage area.

As shown in FIG. 6, in a case that four TRPs may collectively cover a grid area including 1A-4D. Further, it may be set in advance that each beam group may cover a sub-region in this public grid area. For example, the beam 12, the beam 22, a beam 32, and a beam 42 covers a sub-region 1B; a beam 16, a beam 26, a beam 36, and a beam 46 covers a sub-region 2B; and same principle applies to remaining sub-regions.

In the embodiment, the public coverage area of the TRPs means a public coverage area formed by multiple TRPs. Optionally, the multiple TRPs mean TRPs in a same cell.

Step 212: grouping the sub-regions and obtaining at least two region groups, and setting beam groups corresponding to all sub-regions in the public coverage area as target beam groups, wherein each of the region groups includes at least one sub-region.

In this embodiment, a quantity of sub-regions in each of the region groups is related to a quantity of antennas of a TRP. For example, in a case that each TRP may transmit four beams simultaneously through the antennas, each of the region groups may be configured to include four sub-regions. For example, the above region groups may be configured in a following manner.

A first region group includes a sub-region 1A, a sub-region 1B, a sub-region 1C and a sub-region 1D; a second region group includes a sub-region 2A, a sub-region 2B, a sub-region 2C and a sub-region 2D; a third region group includes a sub-region 3A, a sub-region 3B, a sub-region 3C and a sub-region 3D; a fourth region group includes a sub-region 4A, a sub-region 4B, a sub-region 4C and a sub-region 4D.

The controlling beams of the one or more target beam groups to transmit reference signals on reference signal resources corresponding to the beams, includes: performing the beam-training procedure to different region groups in a time-division manner, so as to control beams of all target beam groups in each of the region groups to transmit reference signals on reference signal resources corresponding to the beams simultaneously.

In this embodiment, four region groups are taken as an example for illustration. For example, in a first symbol period, beam groups corresponding to sub-regions in the first region group may be controlled to perform the beam-training procedure simultaneously; in a second symbol period, beam groups corresponding to sub-regions in the second region group may be controlled to perform the beam-training procedure simultaneously; in a third symbol period, beam groups corresponding to sub-regions in the third region group may be controlled to perform the beam-training procedure simultaneously; in a fourth symbol period, beam groups corresponding to sub-regions in the fourth region group may be controlled to perform the beam-training procedure simultaneously. In this way, one beam-training procedure is performed to beams in a cell. Beam-training may also be performed to the beams for multiple times, periodically, which is not described herein in details.

It should be understood that, in the embodiment, since sub-regions in the public coverage areas of TRPs in a cell are grouped, and the beam-training procedures are performed to different region groups in the time-division manner, and thus a beam-training procedure in a cell level is implemented. In this way, beam-training procedures are performed to mobile terminals in the cell, and a mobile terminal in each sub-region in the cell may measure an optimum beam for the mobile terminal through the beam-training procedure.

In this embodiment, a correspondence between beam groups and sub-regions of the coverage area may be set in advance in the network side device, without needing to group temporarily when scheduling users and transmission services, and thus reducing a workload on the network side device. Grouping beams in advance is more stable.

Figure 8:
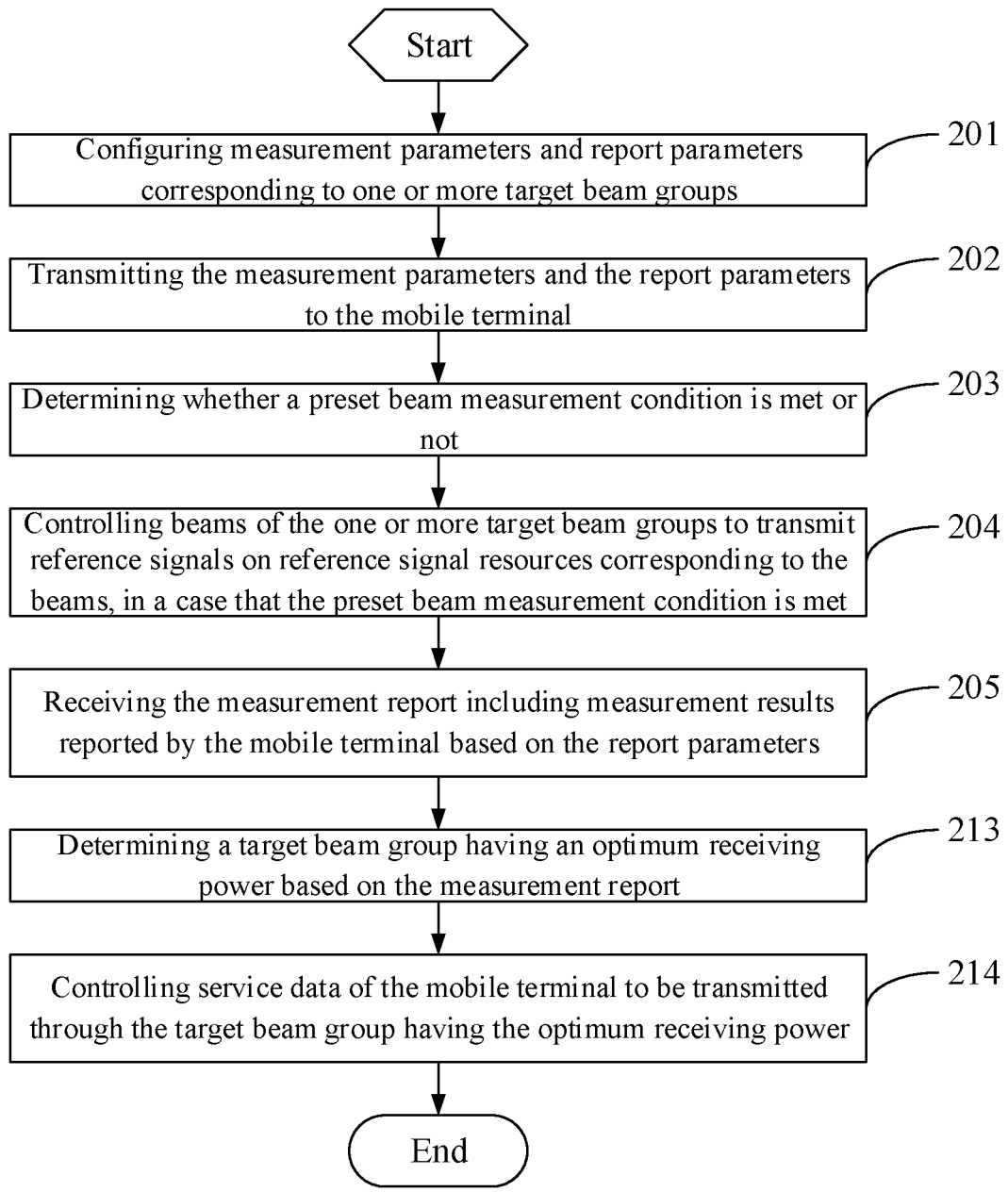
FIG. 8 is a sixth flowchart of a beam measurement and reporting method provided in a second embodiment of the present disclosure.

Optionally, referring to FIG. 8, after performing the step 205, the method further includes steps 213-214.

Step 213: determining a target beam group having an optimum receiving power based on the measurement report.

In this step, the measurement report corresponding to the target beam groups and transmitted by the mobile terminal includes receiving powers corresponding to the target beam groups; through comparing the receiving powers corresponding to the target beam groups, a target beam group having the optimum receiving power may be determined.

Step 214: controlling service data of the mobile terminal to be transmitted through the target beam group having the optimum receiving power.

In this step, the network side device may transmit same service data through all beams in the target beam group having the optimum receiving power, thereby enabling the mobile terminal to receive the service data. Since the network side device transmits the service data of the mobile terminal through the target beam group having the optimum receiving power, a transmission efficiency of the service data may be enhanced.

Figure 9:
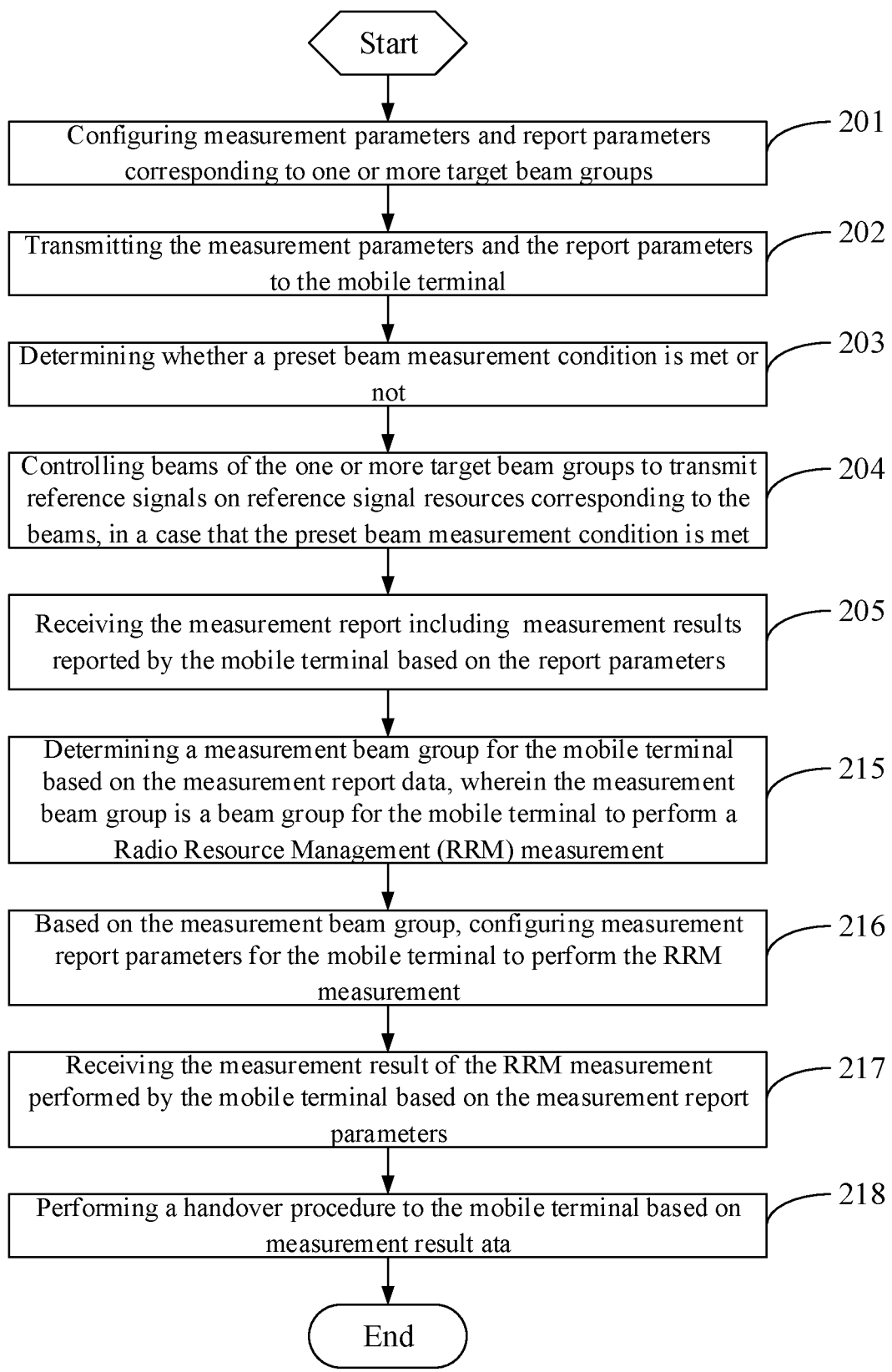
FIG. 9 is a seventh flowchart of a beam measurement and reporting method provided in a second embodiment of the present disclosure.

Further, referring to FIG. 9, after performing the step 205, the method further includes steps 215-218.

Step 215: determining a measurement beam group for the mobile terminal based on the measurement report, wherein the measurement beam group is a beam group for the mobile terminal to perform a Radio Resource Management (RRM) measurement.

In this embodiment, measurement beam groups for the mobile terminal to perform the RRM measurement may be determined based on the measurement report, such as the measurement beam groups may be first N target beam groups having largest receiving powers. Since measurement is firstly performed on receiving powers of the beam groups and then the RRM measurement may be performed, an amount of beams needing to be trained may be reduced and a system overhead may be reduced.

Step 216: based on the measurement beam group, configuring measurement report parameters for the mobile terminal to perform the RRM measurement.

The measurement report parameters for the mobile terminal may be configured based on the measurement beam groups, wherein contents of the measurement report parameters may be set according to actual requirements and are not described herein in details. For example, the contents of the measurement report parameters may include reference signal resources corresponding to each beam and a measurement result needing to be reported.

Step 217: receiving the measurement result of the RRM measurement performed by the mobile terminal based on the measurement report parameters.

After the mobile terminal performs the RRM measurement based on the measurement report parameters, the mobile terminal may report a measurement report corresponding to the RRM measurement so that the network side device may perform a handover procedure.

Step 218: performing the handover procedure to the mobile terminal based on the measurement result.

In this step, the handover procedure of the mobile terminal includes an intra-cell handover procedure and an inter-cell handover procedure. Specifically, a handover strategy may be configured according to actual requirements and is not further limited herein.

Third Embodiment

Figure 10:
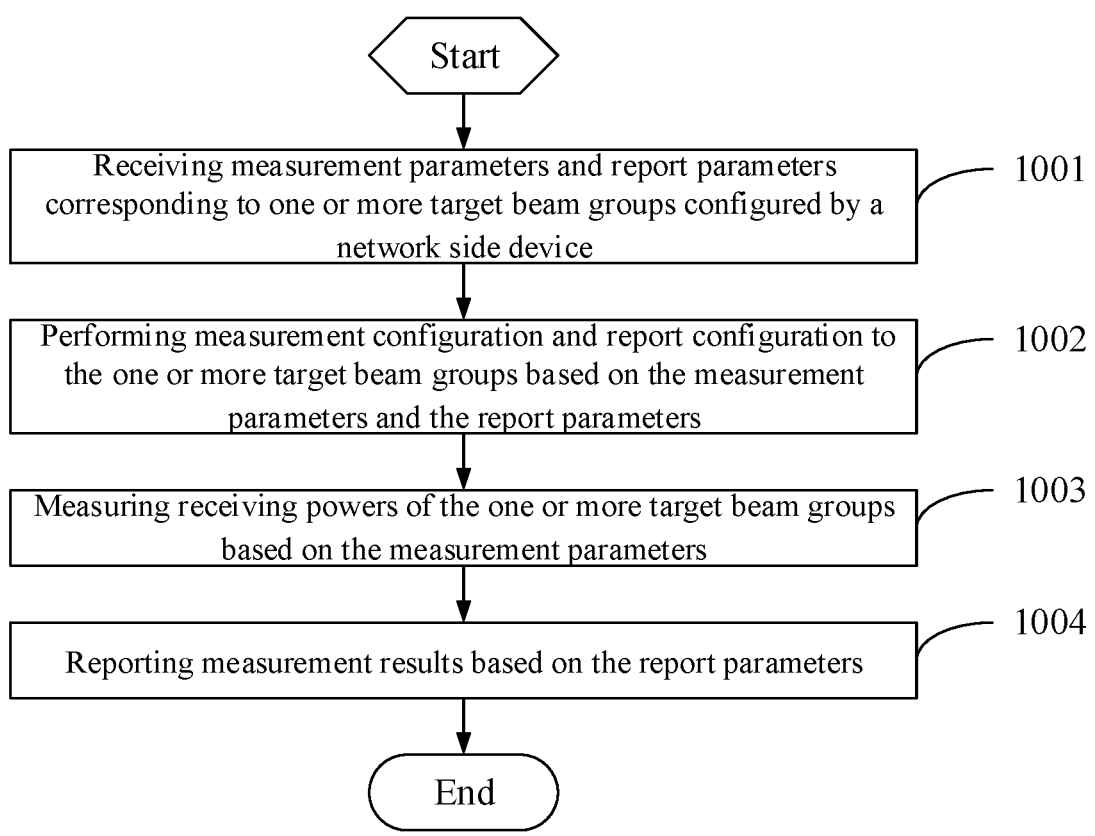
FIG. 10 is a flowchart of a beam measurement and reporting method provided in a third embodiment of the present disclosure.

Referring to FIG. 10, FIG. 10 is a flowchart of a beam measurement and reporting method provided in the embodiments of the present disclosure. As shown in FIG. 10, the method includes following steps 1001-1004.

Step 1001: receiving measurement parameters and report parameters corresponding to one or more target beam groups configured by the network side device.

The beam measurement and reporting method provided in the embodiment of the present disclosure is mainly applied in a mobile terminal. The measurement parameters include reference signal resources. Each of the one or more target beam groups includes beams of at least two Transmission-Reception Points (TRPs), and reference signal resources corresponding to each target beam group are different from reference signal resources corresponding to another target beam group. Reference signal resources corresponding to beams of at least two TRPs in at least one of the one or more target beam groups are same.

It may be understood that the above network side device (also called a MF access device) may be a base station. It may also be understood that a type of the base station is not limited, and the base station may be a Macro Base Station, a Pico Base Station, a Node B (a name of a 3G base station), an enhanced Node B (eNB), a Home eNode B (a Home eNB or a HeNB or a Femto eNB), a relay station, an access point, a Remote Radio Unit (RRU), a Remote Radio Head (RRH), and the like.

In this step, the network side device may configure the measurement parameters and report parameters corresponding to the target beam group for a mobile terminal currently accessing the network side device, so that the mobile terminal may perform measurement and reporting based on the measurement parameters and the report parameters. A rule according to which beams of TRPs are grouped and the target beam group is determined may be configured according to actual requirements and will be described hereinafter in details.

In this embodiment, same reference signal resources may be used for beams in each target beam group, or different reference signal resources may be used for beams in a target beam group. For example, a first reference signal resource may be used for a part of beams in a target beam group, and a second reference signal resource may be used for another part of beams in the target beam group. However, different reference signal resources may be used for different target beam groups.

Step 1002: performing measurement configuration and report configuration to the one or more target beam groups based on the measurement parameters and the report parameters.

In this step, the above measurement parameters are used for the mobile terminal to perform the measurement configuration, and the report parameters are used for the mobile terminal to perform the report configuration.

Specifically, the network side device may transmit, through a preset communication link, the measurement parameters and the report parameters to the mobile terminal having accessed to the network side device. After the mobile terminal receives the measurement parameters and the report parameters, the mobile terminal may perform the measurement configuration based on the measurement parameters and perform the report configuration based on the report parameters.

Step 1003: measuring receiving powers of the one or more target beam groups based on the measurement parameters.

Specifically, in a case that a current time reaches a preconfigured time, the network side device controls each beam to transmit, at the reference signal resource corresponding to the each beam, a reference signal used for measurement, so that the mobile terminal may determine a receiving power (such as a Reference Signal Receiving Power (RSRP)) of the each beam based on the reference signal, so that a receiving power of each target beam may be obtained based on the receiving of each beam. Additionally, in a case that a preset triggering condition is satisfied, each beam may be controlled to transmit the reference signal at the reference signal resource corresponding to the each beam. The mobile terminal performs measurement to the receiving power of each beam based on the reference signal.

Step 1004: reporting measurement results based on the report parameters.

In this step, the mobile terminal may report measurement results of various target beam groups. Specifically, the mobile terminal may only report the measurement results of first N target beam groups having largest receiving powers, i.e., the mobile terminal generates a measurement report based on the measurement results of the first N target beam groups having the largest receiving powers and the report parameters, and reports the measurement report to the network side device to which the mobile terminal has accessed.

In this way, in the embodiments of the present disclosure, the measurement parameters and the report parameters corresponding to the one or more target beam groups configured by the network side device are received, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to the beams of the at least two TRPs in at least one of the one or more target beam groups are same; based on the measurement parameters and the report parameters, the measurement configuration and the reporting measurement are performed on the one or more target beam groups; based on the measurement parameters, measurement for the receiving powers of the target beam groups is performed; and a result of the measurement is reported based on the report parameters. Since the beams to be measured are grouped and configured, and at least two reference signal resources in at least one of the one or more target beam groups are same, a quantity of reference signal resources allocated in a beam training procedure may be reduced, and a system overhead may be reduced, and a problem that the system overhead is large and the quantity of reference signal resources allocated in the beam training procedure is significant is addressed.

Fourth Embodiment

Figure 11:
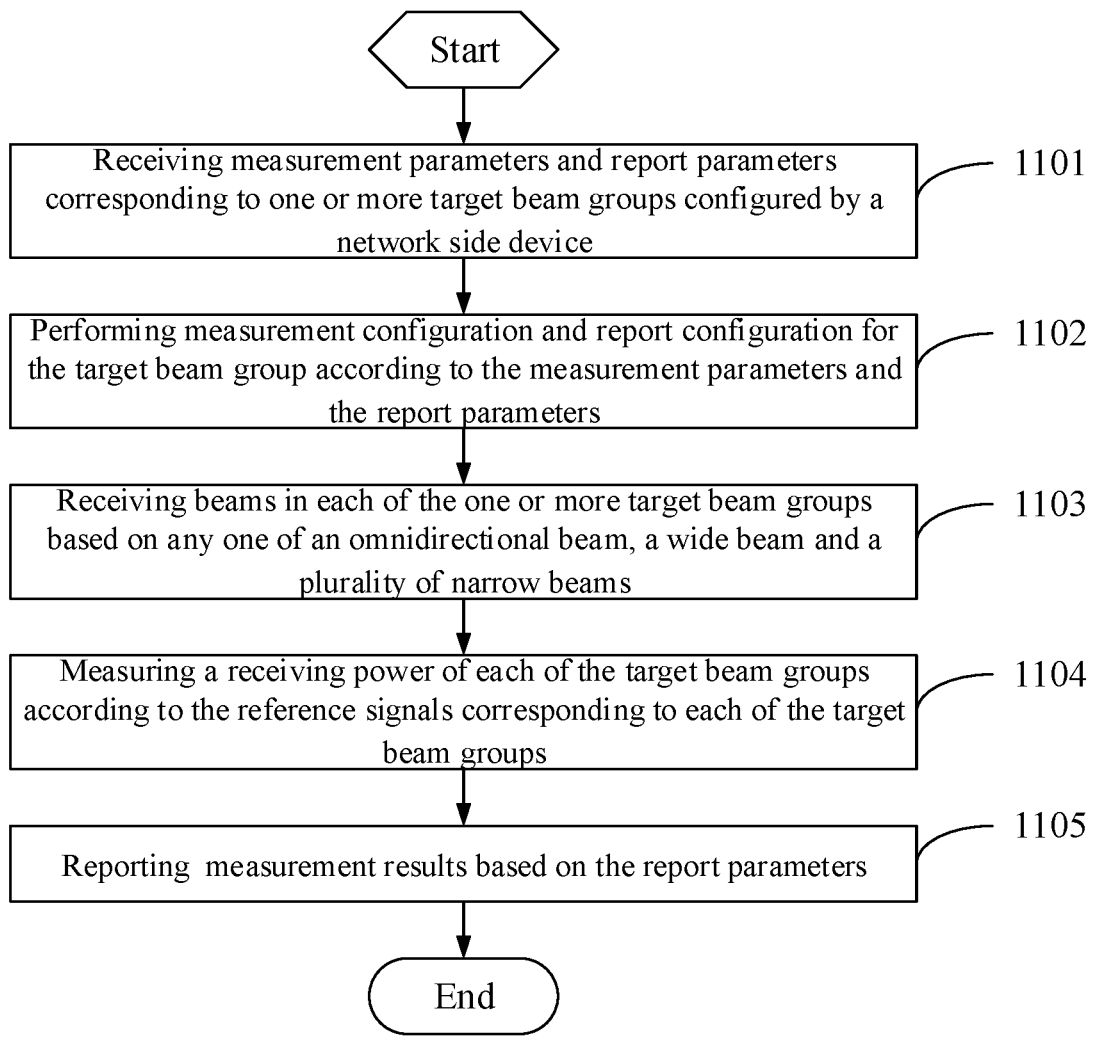
FIG. 11 is a first flowchart of a beam measurement and reporting method provided in a fourth embodiment of the present disclosure.

Referring to FIG. 11, FIG. 11 is a flowchart of a beam measurement and reporting method provided in the embodiments of the present disclosure. As shown in FIG. 11, the method includes following steps 1101-1105.

Step 1101: receiving measurement parameters and report parameters corresponding to one or more target beam groups configured by the network side device.

The beam measurement and reporting method provided in the embodiment of the present disclosure is mainly applied in a mobile terminal. The measurement parameters include reference signal resources. Each of the one or more target beam groups includes beams of at least two Transmission-Reception Points (TRPs), and reference signal resources corresponding to a target beam group are different from reference signal resources corresponding to another target beam group. Reference signal resources corresponding to beams of at least two TRPs in at least one of the one or more target beam groups are same.

It may be understood that the above network side device (also called a MF access device) may be a base station. It may also be understood that a type of the base station is not limited, and the base station may be a Macro Base Station, a Pico Base Station, a Node B (a name of a 3G base station), an enhanced Node B (eNB), a Home eNode B (a Home eNB or a HeNB or a Femto eNB), a relay station, an access point, a Remote Radio Unit (RRU), a Remote Radio Head (RRH), and the like.

In this step, the network side device may configure the measurement parameters and report parameters corresponding to target beam groups for a mobile terminal currently accessing the network side device, so that the mobile terminal may perform measurement and reporting based on the measurement parameters report parameters. A rule according to which beams of TRPs are grouped and the target beam groups are determined may be configured according to actual requirements and will be described hereinafter in details.

In this embodiment, same reference signal resources may be used for beams in each target beam group, or different reference signal resources may be used for beams in a part of one or more target beam groups. For example, a first reference signal resource may be used for a part of beams of a target beam group, and a second reference signal resource may be used for another part of beams of the target beam group. However, different reference signal resources may be used for different target beam groups.

Step 1102: performing measurement configuration and report configuration for the one or more target beam groups based on the measurement parameters and the report parameters.

In this step, the above measurement parameters are used for the mobile terminal to perform measurement configuration, and the report parameters are used for the mobile terminal to perform report configuration.

Specifically, the network side device may transmit, through a preset communication link, the measurement parameters and the report parameters to the mobile terminal having accessed to the network side device. After the mobile terminal receives the measurement parameters and the report parameters, the mobile terminal may perform the measurement configuration based on the measurement parameters and perform the report configuration based on the report parameters.

Step 1103: receiving beams in each of the one or more target beam groups based on any one of an omnidirectional beam, a wide beam and a plurality of narrow beams.

Specifically, in a case that a current time reaches a preconfigured time, the network side device controls each beam to transmit, at a reference signal resource corresponding to each beam, a reference signal used for measurement, so that the mobile terminal may determine a receiving power (such as a Reference Signal Receiving Power (RSRP)) of the each beam based on the reference signal, so that a receiving power of each target beam may be obtained based on the receiving power of each beam. Additionally, in a case that a preset triggering condition is satisfied, each beam may be controlled to transmit the reference signal at the reference signal resource corresponding to the each beam.

Step 1104: measuring the receiving power of each of the target beam groups based on the reference signals corresponding to each of the target beam groups.

The mobile terminal performs measurement to the receiving power of each beam based on the reference signal.

Step 1105: reporting the measurement result based on the report parameters.

In this step, the mobile terminal may report measurement results of various target beam groups. Specifically, the mobile terminal may only report the measurement results of first N target beam groups having largest receiving powers, i.e., the mobile terminal generates a measurement report based on the measurement results of the first N target beam groups having the largest receiving powers and the report parameters, and reports the measurement report to the network side device to which the mobile terminal has accessed.

In this way, in the embodiments of the present disclosure, the measurement parameters and the report parameters corresponding to the one or more target beam groups configured by the network side device are received, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to the beams of the at least two TRPs in at least one of the one or more target beam groups are same; based on the measurement parameters and the report parameters, the measurement configuration and the reporting measurement are performed on the one or more target beam groups; beams in each of the one or more target beam groups are received based on any one of the omnidirectional beam, wide beam or a plurality of narrow beams; the receiving power of each of the one or more target beam groups are measured based on the reference signals corresponding to each of the target beam groups; and the measurement result is reported based on the report parameters. Since the beams to be measured are grouped and configured, and at least two reference signal resources in at least one of the one or more target beam groups are same, a quantity of reference signal resources allocated in the beam-training procedure may be reduced, and a system overhead may be reduced, and a problem that the system overhead is large and the quantity of reference signal resources allocated in the beam-training procedure is significant may be addressed.

It should be understood that the all beams of the one or more target beam groups belong to beams of at least two TRPs of a same network side device, or the all beams of the one or more target beam groups belong to beams of at least two TRPs of different network side devices.

Further, the measurement parameters may also include the measurement period parameters for beam measurement and/or group identifiers of the one or more target beam groups. In this embodiment, the measurement period parameters include period values, time offset values, and durations of measurements. Different time offset values mean that beam measurements are performed for different target beam groups at different period time points. Since the beam measurements may be configured to be performed for different target beam groups at different period time points by configuring different time offset values, flexibility and an application range of the beam measurements may be increased, for example, the time-division manner may be implemented.

Optionally, an association relation is configured between the group identifiers and the reference signal resources corresponding to the one or more target beam groups. The association relation is used by the mobile terminal to determine a target beam group to be measured, based on the reference signal resources.

In this embodiment, the group identifiers may be used to establish the association relation with target beam groups. In such a case, the network side device may directly transmit the group identifiers to the mobile terminal to inform the mobile terminal of the beam groups to be measured; the network side device may also transmit reference signal resources only, and the mobile terminal may indirectly obtain the beam groups to be measured, based on the reference signal resources. In this embodiment, the report parameters include parameters of target beam groups.

In a case that the measurement parameters include group identifiers of target beam groups, the parameters of the target beam groups include the group identifier of the target beam groups and receiving powers corresponding to the target beam groups.

In a case that the measurement parameters do not include group identifiers of target beam groups, the parameters of the target beam groups include receiving powers of reference signal resources corresponding to the target beam groups.

Since in this embodiment, the association relation is established between the group identifiers and the target beam groups, beam groups to be measured by the mobile terminal may be indicated based on the group identifiers or reference signal resources, and thus an operational flexibility is increased.

Optionally, in this embodiment, the report parameters may further include reporting period parameters and/or a timing relation between beam reporting and beam measurement, wherein the timing relation is used by the mobile terminal to perform the beam reporting after a preset time interval since the beam measurement is performed.

In this embodiment, the mobile terminal may periodically perform the beam reporting, or non-periodically perform the beam reporting (i.e., the beam reporting may be controlled based on the timing relation). For example, in a case that the beam reporting is performed based on the timing relation, the beam reporting may be performed after a time interval since each measurement is performed.

Further, before performing the step 1105, the method further includes: determining whether a reporting signaling transmitted by the network side device is received or not; in a case that the reporting signaling is received, performing the step 1105.

In this step, the network side device may trigger the mobile terminal to report, and a reporting manner is non-periodically triggered. In other embodiments, the reporting manner may also be periodically triggered, and is not illustrated herein.

Further, a beam grouping rule may be configured according to actual requirements and will be described hereinafter in details through examples.

Before performing the step 1101, the method further includes: reporting a location of the mobile terminal to the network side device, wherein the location of the mobile terminal is used by the network side device to determine the target beam groups.

The mobile terminal may report the location of the mobile terminal according to a preset period, or may report the location of the mobile terminal according to a preset triggering condition, and a specific manner for reporting the location is not limited herein.

For example, a beam in a direction directing from a TRP1 to the position of the mobile terminal is beam 11, and beams in directions adjacent to the direction are beam 12 and beam 13. Similarly, a beam in a direction directing from a TRP2 to the position of the mobile terminal is beam 21, and beams in directions adjacent to the direction are beam 22 and beam 23. Then, a beam grouping result for the TRP1 and the TRP2 performed by the base station is that a first target beam group includes (beam 11, beam 21), a second target beam group includes (beam 12, beam 22), a third target beam group includes (beam 13, beam 23). The base station may allocate different reference signal resources to different target beam groups, and beams in each of the target beam groups use same reference signal resources, so that a beam-training procedure for the mobile terminal may be performed.

In this embodiment, since beam groups may be established independently for the mobile terminal based on the position of the mobile terminal, a search range for the beam groups may be reduced and a speed of the beam-training procedure may be increased.

Optionally, after performing the step 1105, the method further includes: receiving service data transmitted by the network side device based on the target beam group having the optimum receiving power.

In this step, the measurement report corresponding to the target beam groups and transmitted by the mobile terminal includes receiving powers corresponding to the target beam groups; through comparing the receiving powers corresponding to the target beam groups, a target beam group having the optimum receiving power may be determined.

The network side device may transmit same service data through all beams in the target beam group having the optimum receiving power, thereby enabling the mobile terminal to receive the service data. Since the network side device transmits the service data of the mobile terminal through the target beam group having the optimum receiving power, a transmission efficiency of the service data may be enhanced.

Figure 12:
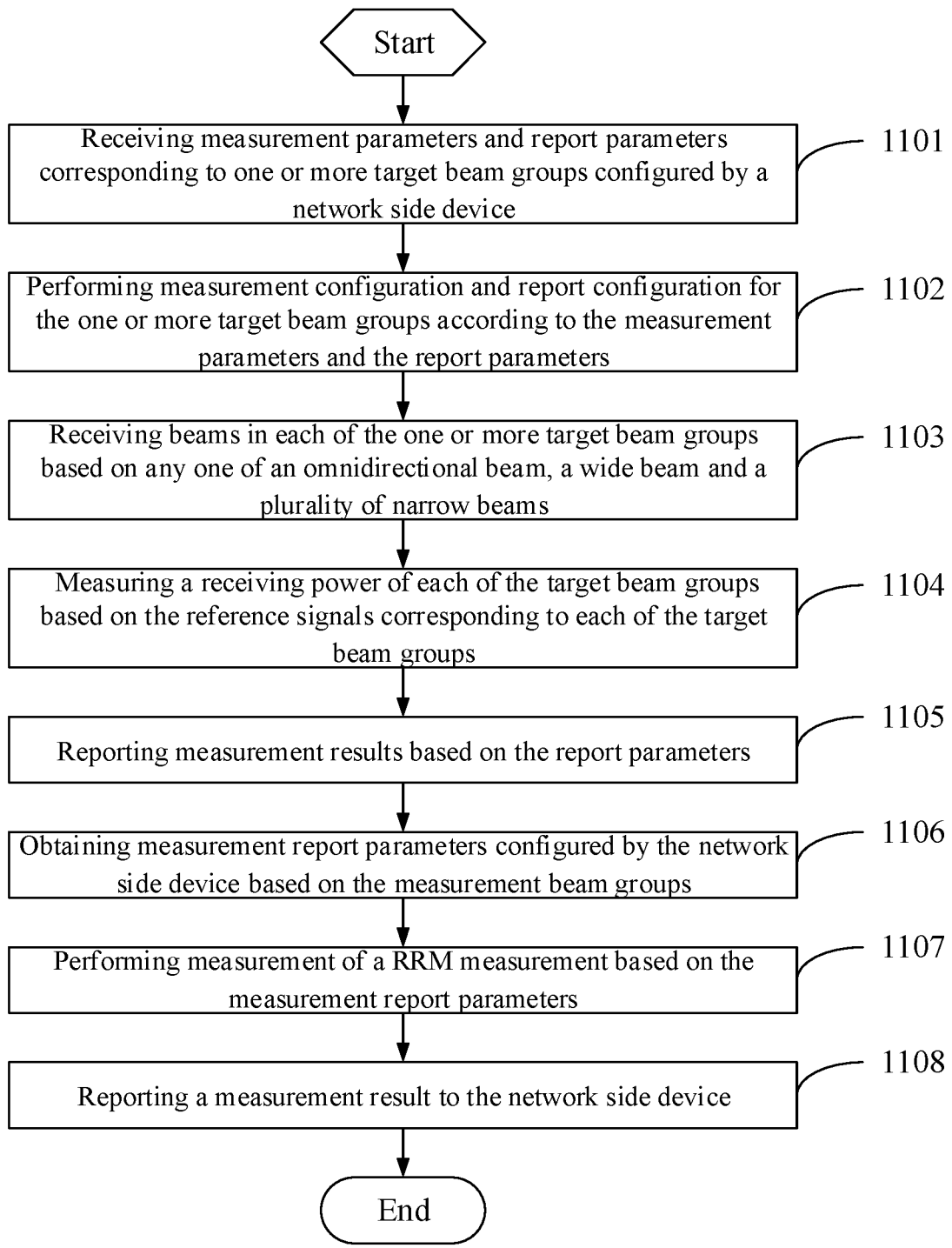
FIG. 12 is a second flowchart of a beam measurement and reporting method provided in a fourth embodiment of the present disclosure.

Further, referring to FIG. 12, after performing the step 1105, the method further includes steps 1106-1108.

Step 1106: obtaining measurement report parameters configured by the network side device based on the measurement beam groups; wherein the measurement beam groups are beam groups determined by the network side device based on the measurement results reported by the mobile terminal, and are used for Radio Resource Management (RRM) measurement.

The measurement report parameters for the mobile terminal may be configured based on the measurement beam groups, wherein contents of the measurement report parameters may be set according to actual requirements and are not described herein in details. For example, the contents of the measurement report parameters may include a reference signal resource corresponding to each beam and a measurement result needing to be reported.

Step 1107: performing measurement of the RRM measurement based on the measurement report parameters.

After the mobile terminal performs measurement of the RRM measurement based on the measurement report parameters, the mobile terminal may report a measurement report corresponding to the RRM measurement so that the network side device may perform a handover procedure.

Step 1108: reporting a measurement result to the network side device, wherein the measurement result is used by the network side device to perform the hand-over procedure for the mobile terminal.

In this step, the handover procedure of the mobile terminal includes an intra-cell handover procedure and an inter-cell handover procedure. Specifically, a handover strategy may be configured according to actual requirements and is not further limited herein.

It should be noted that, the beam reporting may be carried on a Physical Uplink Control Channel (PUCCH) or a Medium Access Control Control Element (MAC CE).

Further, before performing the step 1101, the method further includes: monitoring whether a quality of a communication link of the mobile terminal deteriorates or not; in a case that the quality of the communication link of the mobile terminal deteriorates, transmitting a notification to the network side device, wherein the notification is used to inform the network side device that the quality of the communication link of the mobile terminal deteriorates.

In this embodiment, the network side device may perform a periodic training, or may not perform the periodic training. For example, in the case that the quality of the communication link of the mobile terminal deteriorates, the beam-training procedure may be performed so as to enhance pertinence of the beam-training procedure. Specifically, a manner in which the quality deterioration of the communication link of the mobile terminal is monitored may be configured according to actual requirements. For example, the network side device may actively monitor the quality of the communication link of the mobile terminal, or the mobile terminal may also monitor the quality of the communication link, and in a case that the mobile terminal monitors the quality of the communication link to deteriorate, the mobile terminal may transmit the notification to the network side device to announce that the quality of the communication link between the mobile terminal and the network side device deteriorates. Specifically, the mobile terminal may directly transmit to the network side device a quality data, as the notification, of the communication link being monitored, and the network side device may determine whether to perform a beam-training procedure. The mobile terminal may also transmit, to the network side device, a monitoring result of the quality of the communication link being monitored and the network side device may perform the beam-training procedure after the network side device receives the result.

Fifth Embodiment

Figure 13:
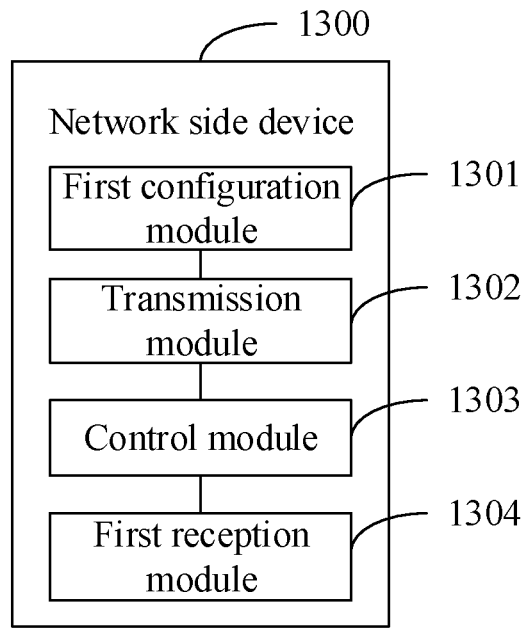
FIG. 13 is a first structural schematic diagram of a network side device provided in a fifth embodiment of the present disclosure.

Referring to FIG. 13, FIG. 13 is a structural diagram of a network side device provided in the embodiments of the present disclosure. The network side device may achieve details of the beam measurement and reporting method in the first and the second embodiments of the present disclosure and may achieve same technical effects. As shown in FIG. 13, the network side device 1300 includes a first configuration module 1301, a transmission module 1302, a control module 1303, and a first reception module 1304.

The first configuration module 1301 is configured for configuring measurement parameters and report parameters corresponding to one or more target beam groups. The measurement parameters include reference signal resources. Each of the one or more target beam groups includes beams of at least two Transmission-Reception Points (TRPs), and reference signal resources corresponding to each of the one or more target beam groups are different from reference signal resources corresponding to another of the one or more target beam groups. Reference signal resources corresponding to beams of at least two TRPs in at least one of the one or more target beam groups are same.

The transmission module 1302 is configured for transmitting the measurement parameters and the report parameters to the mobile terminal. The measurement parameters are used for the mobile terminal to perform measurement configuration, and the report parameters are used for the mobile terminal to perform report configuration.

The control module 1303 is configured for controlling beams of the one or more target beam groups to transmit reference signals on reference signal resources corresponding to the beams. The reference signals are used by the mobile terminal to perform beam measurement.

The first reception module 1304 is configured for receiving a measurement report including measurement results reported by the mobile terminal based on the report parameters.

Figure 14:
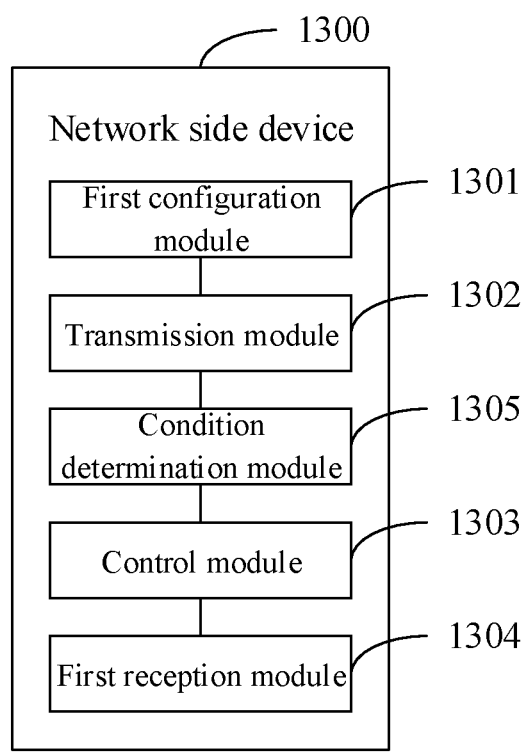
FIG. 14 is a second structural schematic diagram of a network side device provided in the fifth embodiment of the present disclosure.

Optionally, referring to FIG. 14, the above network side device 1300 may further include: a condition determination module 1305, configured for determining whether a preset beam measurement condition is met or not; triggering the control module 1303 to control beams of the one or more target beam groups to transmit reference signals on reference signal resources corresponding to the beams, in a case that the preset beam measurement condition is met; wherein the preset beam measurement condition includes at least one of: a condition that a quality deterioration of a communication link of a mobile terminal is monitored by the network side device, a condition that a notification transmitted by the mobile terminal in case of the quality deterioration of the communication link of the mobile terminal monitored by the mobile terminal is received, or a condition that a current time reaches a preset beam measurement period.

Optionally, all beams in each of the one or more target beam groups use a same reference signal resource.

Optionally, the control module 1303 is specifically configured for controlling all beams in each of the one or more target beam groups to transmit the reference signals at the reference signal resource corresponding to the all beams simultaneously.

Optionally, the all beams of the one or more target beam groups belong to beams of at least two TRPs of a same network side device 1300, or the all beams of the one or more target beam groups belong to beams of at least two TRPs of different network side devices 1300.

Optionally, in a case that the all beams of the one or more target beam groups belong to the beams of at least two TRPs of different network side device 1300, the control module 1303 is specifically configured for: transmitting, to the network side device 1300 corresponding to beams of each target beam group, measurement period parameters for beam measurement and reference signal resources corresponding to beams of the each target beam group, wherein the measurement period parameters are used to control the network side device 1300 corresponding to the beams of the each target beam group to transmit reference signals at the reference signal resource corresponding to the beams.

Optionally, the measurement parameters may also include the measurement period parameters for beam measurement and/or group identifiers of the one or more target beam groups.

Optionally, the measurement period parameters include period values, time offset values, and durations of measurements.

Optionally, an association relation is configured between the group identifiers and the reference signal resources corresponding to the one or more target beam groups. The association relation is used by the mobile terminal to determine target beam groups to be measured, based on the reference signal resources.

Optionally, the report parameters include parameters of a target beam group.

In a case that the measurement parameters include group identifiers of target beam groups, the parameters of the target beam groups include the group identifiers of the target beam groups and receiving powers corresponding to the target beam groups.

In a case that the measurement parameters do not include group identifiers of target beam groups, the parameters of the target beam groups include receiving powers on reference signal resources corresponding to the target beam groups.

Optionally, the report parameters may further include reporting period parameters and/or a timing relation between beam reporting and beam measurement, wherein the timing relation is used by the mobile terminal to perform the beam reporting after a preset time interval since the beam measurement is performed.

Figure 15:
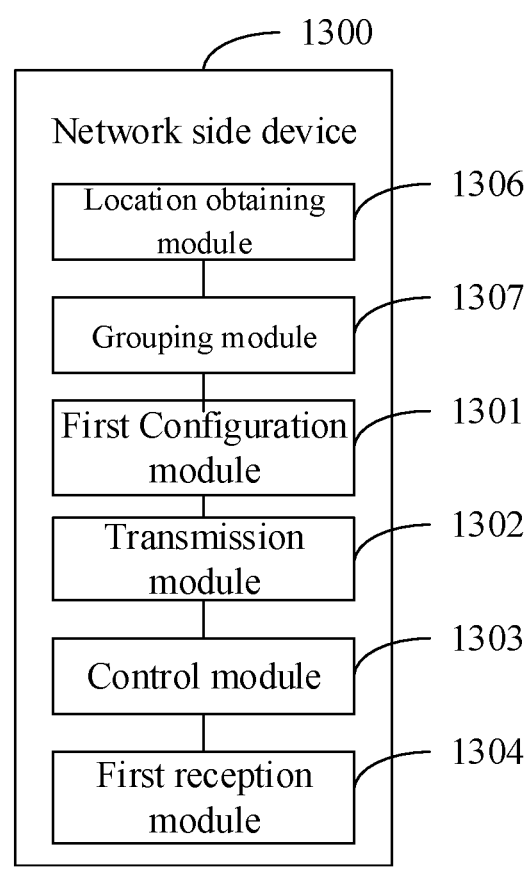
FIG. 15 is a third structural schematic diagram of a network side device provided in the fifth embodiment of the present disclosure.

Optionally, referring to FIG. 15, the above network side device 1300 may further include: a location obtaining module 1306, configured for obtaining a location of the mobile terminal; a grouping module 1307, configured for grouping first beams and second beams to obtain the target beam group, wherein the first beams are beams pointing to the location of the mobile terminal from at least one TRP, and the second beams are beams adjacent to directions directed by the first beams.

Optionally, the location obtaining module 1306 is specifically configured for receiving the location reported by the mobile terminal according to a preset period; or receiving a location reported by the mobile terminal according to a preset triggering condition; or obtaining a location of the mobile terminal through measuring a positioning reference signal.

Figure 16:
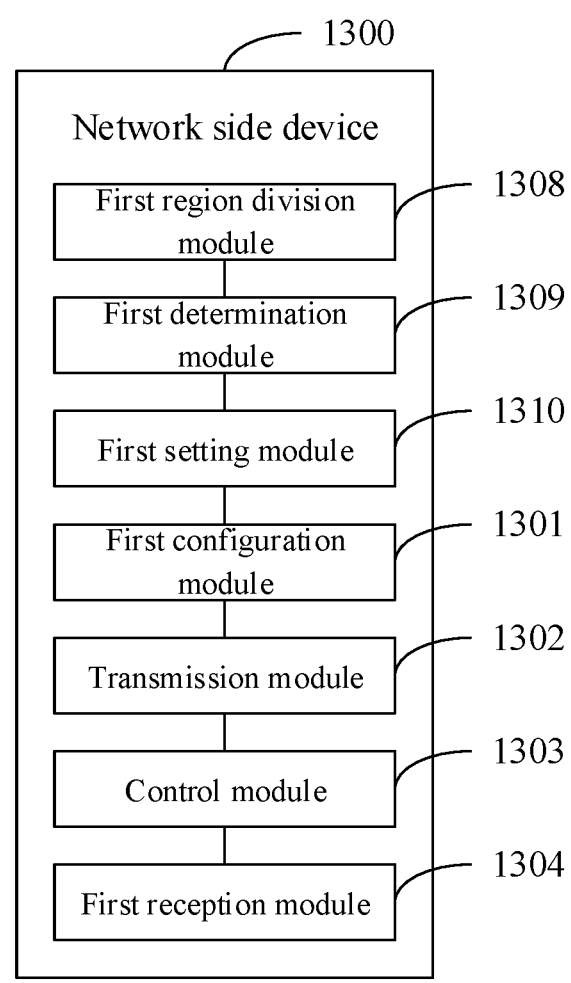
FIG. 16 is a fourth structural schematic diagram of a network side device provided in the fifth embodiment of the present disclosure.

Optionally, referring to FIG. 16, the above network side device 1300 may further include: a first region division module 1308, configured for dividing a public coverage area of TRPs, and configuring different beam groups to cover different sub-regions of the public coverage area; a first determination module 1309, configured for determining a first sub-region in which the mobile terminal is located, and second sub-regions adjacent to the first sub-region; and a first setting module 1310, configured for setting beam groups corresponding to the first sub-region and the second sub-regions as target beam groups.

Figure 17:
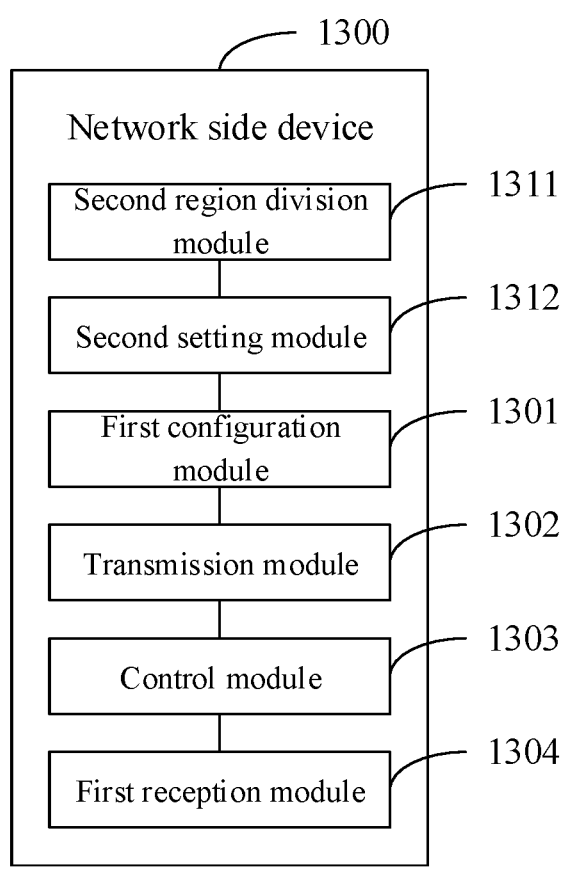
FIG. 17 is a fifth structural schematic diagram of a network side device provided in the fifth embodiment of the present disclosure.

Optionally, referring to FIG. 17, the above network side device 1300 may further include: a second region division module 1311, configured for dividing a public coverage area of TRPs, and configuring different beam groups to cover different sub-regions of the public coverage area; a second setting module 1312, configured for grouping the sub-regions and obtaining at least two region groups, and setting beam groups corresponding to all sub-regions in the public coverage area as target beam groups, wherein each of the region groups includes at least one sub-region; the control module 1303 is specifically configured for performing a beam-training procedure to different region groups in a time-division manner, so as to control beams of all target beam groups in each of the region groups and transmit simultaneously reference signals on reference signal resources corresponding to the beams.

Figure 18:
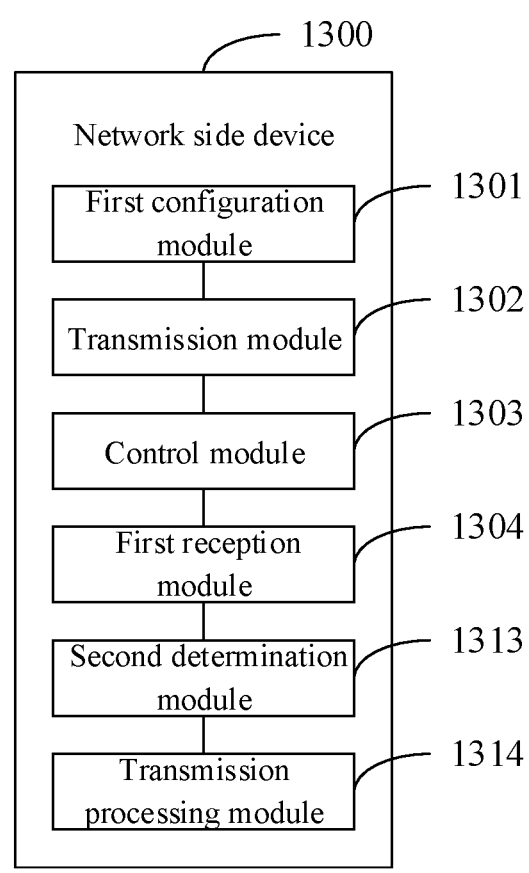
FIG. 18 is a sixth structural schematic diagram of a network side device provided in the fifth embodiment of the present disclosure.

Optionally, referring to FIG. 18, the network side device 1300 may further include: a second determination module 1313, configured for determining a target beam group having an optimum receiving power based on a measurement report; and a transmission processing module 1314, configured for controlling service data of the mobile terminal to be transmitted through the target beam group having the optimum receiving power.

Figure 19:
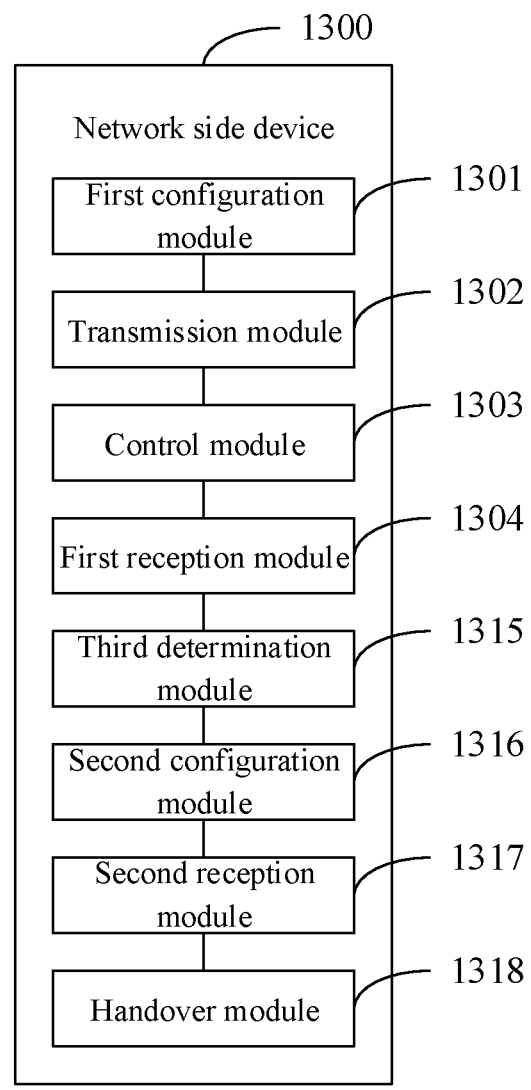
FIG. 19 is a seventh structural schematic diagram of a network side device provided in the fifth embodiment of the present disclosure.

Optionally, referring to FIG. 19, the network side device 1300 may further include: a third determination module 1315, configured for determining measurement beam groups for the mobile terminal based on the measurement report, wherein the measurement beam groups are beam groups for the mobile terminal to perform Radio Resource Management (RRM) measurement; a second configuration module 1316, configured for, based on the measurement beam groups, configuring measurement report parameters for the mobile terminal to perform the RRM measurement; a second reception module 1317, configured for receiving the measurement result of the RRM measurement performed by the mobile terminal based on the measurement report parameters; and a handover module 1318, configured for performing a handover procedure for the mobile terminal based on the measurement result.

In this way, in the embodiments of the present disclosure, since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant may be addressed.

Sixth Embodiment

Figure 20:
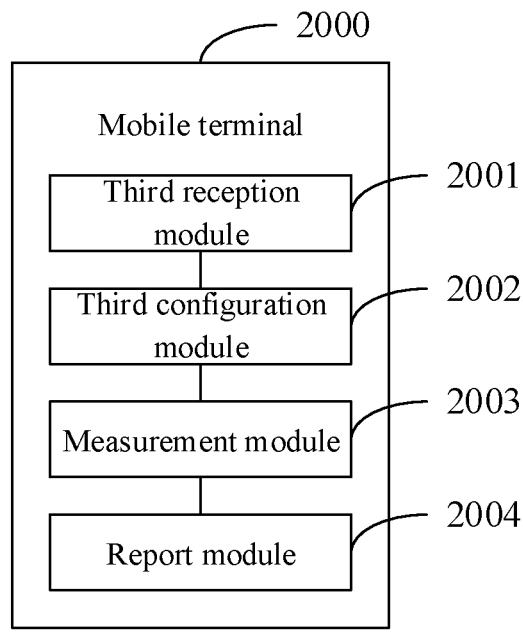
FIG. 20 is a first structural schematic diagram of a mobile terminal provided in a sixth embodiment of the present disclosure.

Referring to FIG. 20, FIG. 20 is a structural diagram of a mobile terminal provided in the embodiments of the present disclosure. The mobile terminal may achieve details of the beam measurement and reporting method in the third and the fourth embodiments of the present disclosure and may achieve same technical effects. As shown in FIG. 20, the mobile terminal 2000 includes a third reception module 2001, a third configuration module 2002, a measurement module 2003, a report module 2004.

The third reception module 2001 is configured for receiving measurement parameters and report parameters corresponding to one or more target beam groups configured by a network side device. The measurement parameters include reference signal resources. Each of the one or more target beam groups includes beams of at least two Transmission-Reception Points (TRPs), and reference signal resources corresponding to a target beam group are different from reference signal resources corresponding to another target beam group. Reference signal resources corresponding to beams of at least two TRPs in at least one of the one or more target beam groups are same.

The third configuration module 2002, is configured for performing measurement configuration and report configuration to the target beam groups based on the measurement parameters and the report parameters.

The measurement module 2003 is configured for measuring receiving powers of the target beam groups based on the measurement parameters.

The report module 2004 is configured for reporting measurement results based on the report parameters.

Optionally, the measurement module 2003 is specifically configured for receiving beams in each of the one or more target beam groups based on any one of an omnidirectional beam, a wide beam and a plurality of narrow beams; and measuring receiving powers of each of the one or more target beam groups according to reference signals corresponding to each of the target beam groups.

Optionally, all beams in each of the one or more target beam groups use a same reference signal resource.

Optionally, the all beams of one or more target beam groups belong to beams of at least two TRPs of a same network side device, or the all beams of the one or more target beam groups belong to beams of at least two TRPs of different network side devices.

Optionally, the measurement parameters may also include the measurement period parameters for beam measurement and/or group identifiers of the one or more target beam groups.

Optionally, the measurement period parameters include period values, time offset values, and durations of measurements.

Optionally, an association relation is configured between the group identifiers and the reference signal resources corresponding to the one or more target beam groups. The association relation is used by the mobile terminal 2000 to determine target beam groups to be measured, based on the reference signal resources.

Optionally, the report parameters include parameters of the target beam groups. In a case that the measurement parameters include group identifiers of target beam groups, the parameters of the target beam groups include the group identifiers of the target beam groups and receiving powers corresponding to the target beam groups. In a case that the measurement parameters do not include group identifiers of target beam groups, the parameters of the target beam groups includes receiving powers on the reference signal resources corresponding to the target beam groups.

Optionally, the report parameters may further include reporting period parameters and/or a timing relation between beam reporting and beam measurement, wherein the timing relation is used by the mobile terminal 2000 to perform the beam reporting after a preset time interval since the beam measurement is performed.

Figure 21:
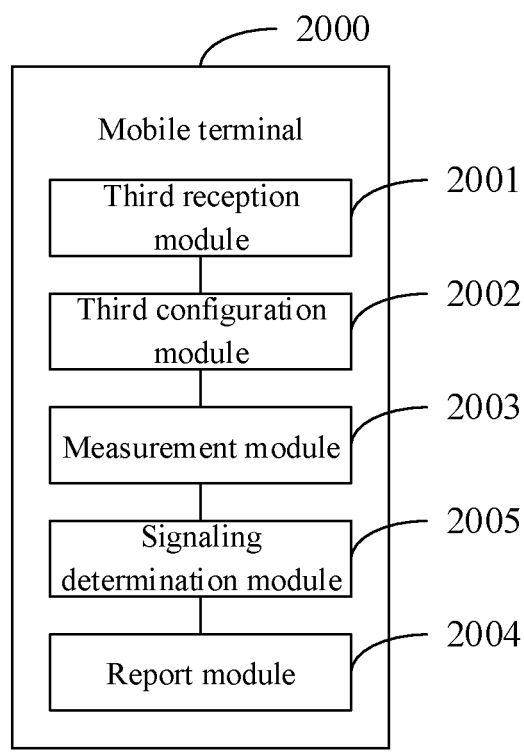
FIG. 21 is a second structural schematic diagram of a mobile terminal provided in the sixth embodiment of the present disclosure.

Optionally, referring to FIG. 21, the above network side device 2000 may further include: a signaling determination module 2005, configured for determining whether a reporting signaling transmitted by the network side device is received or not; if the reporting signaling transmitted by the network side device is received, triggering the report module to report the measurement result according the report parameters.

Optionally, the report module 2004 is further configured for reporting a location of the mobile terminal 200 to the network side device, wherein the location of the mobile terminal is used by the network side device to determine the target beam groups.

Optionally, the third reception module 2001 is further configured for receiving service data transmitted by the network side device based on the target beam group having the optimum receiving power.

Figure 22:
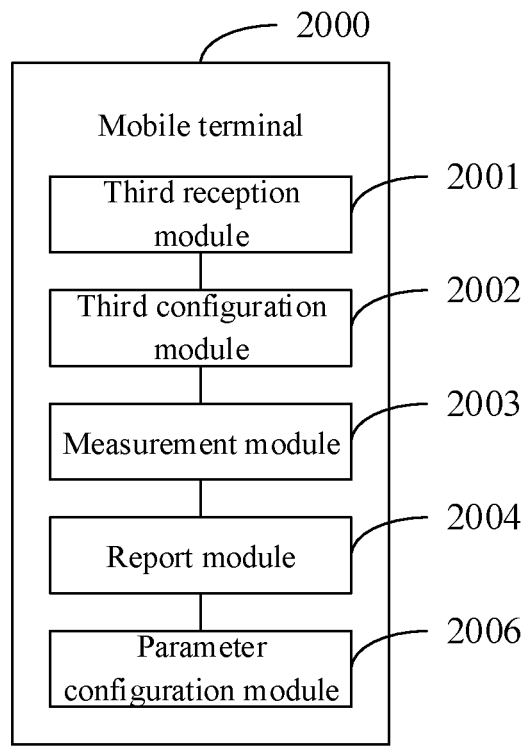
FIG. 22 is a third structural schematic diagram of a mobile terminal provided in the sixth embodiment of the present disclosure.

Optionally, referring to FIG. 22, the above mobile terminal 2000 may further include a parameter configuration module 2006. The parameter configuration module 2006 is configured for, obtaining measurement report parameters configured by the network side device based on the measurement beam groups; wherein the measurement beam groups are beam groups determined by the network side device based on the measurement results reported by the mobile terminal, and are used for RRM measurement.

The measurement module 2003 is further configured for performing measurement of the RRM measurement based on the measurement report parameters.

The report module 2004 is further configured for reporting a measurement result to the network side device, wherein the measurement result is used by the network side device to perform the handover procedure for the mobile terminal 2000.

Optionally, the beam reporting is carried on a Physical Uplink Control Channel or a Medium Access Control Control Element.

Optionally, the mobile terminal 2000 may further include: a monitoring module configured for monitoring whether a quality of a communication link of the mobile terminal 2000 deteriorates or not; and a notification module, configured for in a case that the quality of the communication link of the mobile terminal 2000 deteriorates, transmitting a notification to the network side device, wherein the notification is used to inform the network side device that the quality of the communication link of the mobile terminal 2000 deteriorates.

In this way, in the embodiments of the present disclosure, since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant may be addressed.

Seventh Embodiment

Figure 23:
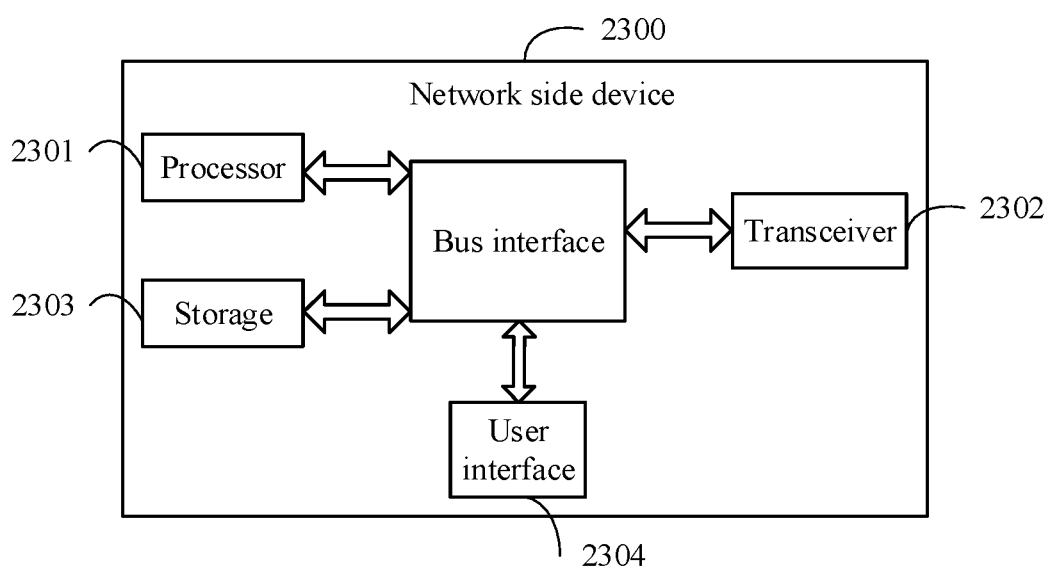
FIG. 23 is a structural schematic diagram of a network side device provided in a seventh embodiment of the present disclosure.

Referring to FIG. 23, FIG. 23 is a structural diagram of a network side device provided in the embodiments of the present disclosure. The network side device may achieve details of the beam measurement and reporting method in the first and the second embodiments of the present disclosure and may achieve same technical effects. As shown in FIG. 23, the network side device 2300 includes a processor 2301, a transceiver 2302, a storage 2303, a user interface 2304 and a bus interface.

The processor 2301 is configured to read programs in the storage 2303 to perform the following steps: configuring measurement parameters and report parameters corresponding to the one or more target beam groups are configured, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to the beams of the at least two TRPs in at least one of the one or more target beam groups are same; transmitting the measurement parameters and the report parameters to the mobile terminal, wherein the measurement parameters are used for the mobile terminal to perform the measurement configuration, and the report parameters are used for the mobile terminal to perform the report configuration; controlling beams of the one or more target beam groups to transmit reference signals on reference signal resources corresponding to the beams, wherein the reference signals are used for the mobile terminal to perform beam measurement; and, receiving a measurement report of a measurement result reported by the mobile terminal based on the report parameters.

In FIG. 23, a bus architecture may include any number of buses and bridges connected together. Specifically, a plurality of processors such as the processor 2301 and a plurality of storages such as the storage 2303 are connected together. The bus architecture may also cause any other circuits such as a peripheral device, a voltage regulator and a power management circuit to be connected together. The circuits are known in the art, and thus detailed description thereof is not further provided herein. The bus interface provides an interface. The transceiver 2302 may include a plurality of elements such as receivers, transmitters, and units for communicating with other devices through a transmission medium. Directed to different user equipments, the user interface 2304 may also be an interface capable of being connected to external devices including, but not limited to, keypads, displays, speakers, microphones, joysticks, or the like.

The processor 2301 takes charge of managing the bus architecture and general processing transactions. The storage 2303 may store data used by the processor 2301 when the processor 2301 performs operations.

Optionally, the processor 2301 is further configured for: determining whether a preset beam measurement condition is met or not; in a case that the preset beam measurement condition is met, performing the step of controlling beams of one or more target beam groups to transmit reference signals according to reference signal resources corresponding to the beams; wherein, the preset beam measurement condition includes at least one of: a condition that a quality deterioration of a communication link of a mobile terminal is monitored by the network side device, a condition that a notification transmitted by the mobile terminal in case of the quality deterioration of the communication link of the mobile terminal monitored by the mobile terminal is received, or a condition that a current time reaches a preset beam measurement period.

Optionally, all beams in each of the one or more target beam groups use a same reference signal resource.

Optionally, the processor 2301 is specifically configured for controlling all beams in each of the one or more target beam groups to transmit simultaneously the reference signals at the reference signal resource corresponding to the all beams.

Optionally, the all beams of the one or more target beam groups belong to beams of at least two TRPs of a same network side device, or the all beams of the one or more target beam groups belong to beams of at least two TRPs of different network side devices.

Optionally, in a case that all beams of the one or more target beam groups belong to beams of at least two TRPs of different network side devices, the processor 2301 is further configured for transmitting, to a network side device corresponding to beams of each target beam group, measurement period parameters for beam measurement and reference signal resources corresponding to beams of the each target beam group, wherein the measurement period parameters are used to control the network side device corresponding to the beams of the each target beam group to transmit the reference signals on the reference signal resources corresponding to the beams.

Optionally, the measurement parameters may also include the measurement period parameters for beam measurement and/or group identifiers of the one or more target beam groups.

Optionally, the measurement period parameters include period values, time offset values, and durations of measurements.

Optionally, an association relation is configured between the group identifiers and the reference signal resources corresponding to the one or more target beam groups. The association relation is used by the mobile terminal to determine target beam groups to be measured, based on the reference signal resources.

Optionally, the report parameters include parameters of the target beam groups. In a case that the measurement parameters include group identifiers of target beam groups, the parameters of the target beam groups include group identifiers of the target beam groups and receiving powers corresponding to the target beam groups. In a case that the measurement parameters do not include group identifiers of target beam groups, the parameters of the target beam groups include the receiving powers of the reference signal resources corresponding to the target beam groups.

Optionally, the report parameters may further include reporting period parameters and/or a timing relation between beam reporting and beam measurement, wherein the timing relation is used by the mobile terminal to perform the beam reporting after a preset time interval since the beam measurement is performed.

Optionally, the processor 2301 is further configured for: obtaining a location of the mobile terminal; grouping first beams and second beams to obtain the one or more target beam groups, wherein the first beam are beams pointing to the location of the mobile terminal from at least one TRP, and the second beams are beams adjacent to directions directed by the first beams.

Optionally, the processor 2301 is further configured for receiving the location reported by the mobile terminal according to a preset period; or receiving a location reported by the mobile terminal according to a preset triggering condition; or obtaining a location of the mobile terminal through measuring a positioning reference signal.

Optionally, the processor 2301 is further configured for: dividing a public coverage area of TRPs, and configuring different beam groups to cover different sub-regions of the public coverage area; determining a first sub-region in which the mobile terminal is located, and second sub-regions adjacent to the first sub-region; setting beam groups corresponding to the first sub-region and the second sub-regions as target beam groups.

Optionally, the processor 2301 is further configured for: dividing the public coverage area of the TRPs, and configuring different beam groups to cover different sub-regions of the public coverage area; grouping the sub-regions and obtaining at least two region groups, and setting beam groups corresponding to all sub-regions in the public coverage area as target beam groups, wherein each of the region groups includes at least one sub-region; the step of controlling beams of the one or more target beam groups to transmit the reference signals on reference signal resources corresponding to the beams, includes: performing beam-training procedures to different region groups in a time-division manner, so as to control beams of all target beam groups in each of the region groups to transmit reference signals on reference signal resources corresponding to the beams simultaneously.

Optionally, the processor 2301 is further configured for: determining a target beam group having an optimum receiving power based on a measurement report; controlling service data of the mobile terminal to be transmitted through the target beam group having the optimum receiving power.

Optionally, the processor 2301 is further configured for: determining measurement beam groups for the mobile terminal based on the measurement report, wherein the measurement beam groups are beam groups for the mobile terminal to perform Radio Resource Management (RRM) measurement; based on the measurement beam groups, configuring measurement report parameters for the mobile terminal to perform the RRM measurement; receiving a measurement result of the RRM measurement performed by the mobile terminal based on the measurement report parameters; performing a handover procedure of the mobile terminal based on the measurement result.

In this way, in the embodiments of the present disclosure, since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure of beams is significant may be addressed.

Eighth Embodiment

Figure 24:
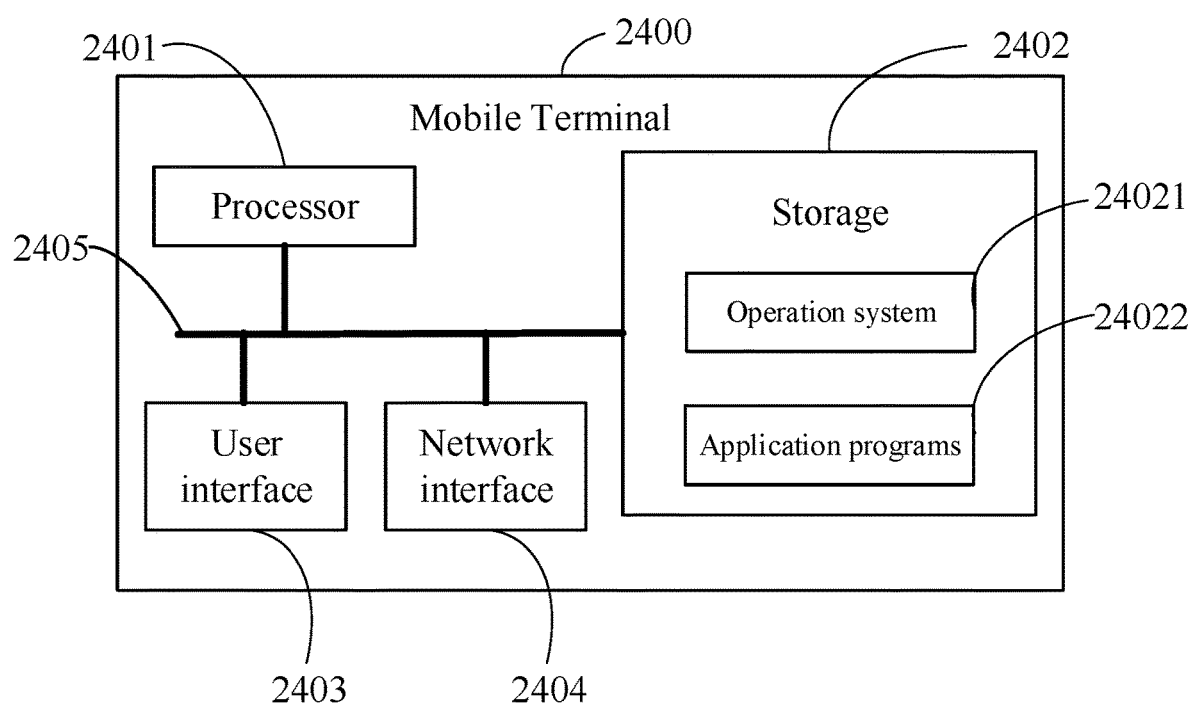
FIG. 24 is a structural schematic diagram of a mobile terminal provided in an eighth embodiment of the present disclosure.

Referring to FIG. 24, FIG. 24 is a structural diagram of a mobile terminal provided in the embodiments of the present disclosure. The mobile terminal may achieve details of the beam measurement and reporting method in the third and the fourth embodiments of the present disclosure and may achieve same technical effects. As shown in FIG. 24, the mobile terminal 2400 includes at least one processor 2401, a storage 2402, at least one network interface 2404 and a user interface 2403. Various components of the mobile terminal 2400 are connected through a bus system 2405. It may be understood that the bus system 2405 is used to implement communication among the components. The bus system 2405 includes a data bus, a power bus, a control bus, and a status signal bus. However, for sake of clear illustration, all buses in FIG. 24 are marked as the bus system 2405.

The user interface 2403 may include a display, a keyboard or a pointing device (such as a mouse or a track ball), a touch panel or a touch screen.

It may be understood that the storage 2402 in the embodiments of the present disclosure may be a volatile storage or a non-volatile storage, or may include both a volatile storage and a non-volatile storage. The non-volatile storage may be a Read-Only Memory (ROM), a Programmable ROM (PROM), an Erasable PROM (EPROM), an Electrically EPROM (EEPROM), or a flash memory. The volatile memory may be a Random Access Memory (RAM) which is used for external cache. By way of example, not taken as limited illustration, many forms of RAM may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Sync link DRAM, SLDRAM), and a Direct Rambus RAM (DRRAM). The storage 2402 in the device and the method described in the present disclosure includes, but is not limited to, these or any other suitable types of storages.

In some embodiments, the storage 2402 stores following elements: executable modules or data structure, or subsets thereof, or expanded sets thereof; an operation system 24021 and application programs 24022.

The operation system 24021 includes various system programs, such as a frame layer, a core library layer, a driver layer, and the like, configured for implementing various basic services and processing tasks based on hardware. The application programs 24022 include various application programs, such as a Media Player, a Browser, configured for implement various application functions. Programs for implementing the method of the embodiments of the present disclosure may be included in the application programs 24022.

In the embodiments of the present disclosure, through invoking programs or instructions stored in the storage 2402, specifically through invoking programs or instructions stored in the application programs 24022, the processor 2401 is further configured for receiving the measurement parameters and the report parameters corresponding to the one or more target beam groups configured by the network side device, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to beams of at least two TRPs in at least one of the one or more target beam groups are same; based on the measurement parameters and the report parameters, the measurement configuration and the reporting measurement are performed on the target beam groups; based on the measurement parameters, measurement for the receiving powers of the target beam groups is performed; and measurement results are reported based on the report parameters.

The method disclosed in the embodiments of the present disclosure may be applied in the processor 2401, or be implemented by the processor 2401. The processor 2401 may be an integrated-circuit chip provided with a signal processing capability. In the implementation, the steps of the method may be implemented by integrated circuits in the processor 2401 or implemented by instructions in a form of software. The processor 2401 may be a general processor, a Digital Signal Processor (DSP), an Application Specific Integrated Circuit (ASIC), a Field Programmable Gate Array (FPGA), or other programmable logic devices, discrete gates or transistor logic devices, discrete hardware components. The method, the steps and the logic blocks in the embodiments of the present disclosure may be implemented or executed by the processor. The general processor may be a microprocessor or may be any general processor. The steps of the method disclosed by the embodiments of the present disclosure may be embodied directly as hardware decoding processor, or implemented by a combination of hardware and software modules in the decoding processor. Software modules may be located in known storage mediums in the art such as a random access memory, a flash memory, a read only memory, a programmable read only memory or an electrically erasable and programmable memory and register. The storage medium is in the storage 2402, and the processor 2401 reads information in the storage 2402 and completes the steps in the above method by combining the information with hardware in the processor 2401.

It may be understood that the embodiments of the present disclosure may be implemented by hardware, software, firmware, middleware, micro codes, or a combination thereof. In case of implementation through hardware, the processing units may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general processor, a controller, a micro controller, a microprocessor, other electronic units capable of performing the functions of the present disclosure, or a combination of the above.

In case of implementation through software, modules (such as processors, functions) capable of performing the functions of the present disclosure may be used to implement the techniques in the present disclosure. Software codes may be stored in the storage and executed by the processor. The storage may be implemented in a processor or implemented outside of the processor.

Optionally, the processor 2401 is specifically configured for receiving beams in each of the one or more target beam groups based on any one of an omnidirectional beam, a wide beam and a plurality of narrow beams; and measuring receiving powers of each of the one or more target beam groups according to reference signals corresponding to each of the one or more target beam groups.

Optionally, all beams in each of the one or more target beam groups use a same reference signal resource.

Optionally, all beams of the one or more target beam groups belong to beams of at least two TRPs of a same network side device, or the all beams of the one or more target beam groups belong to beams of at least two TRPs of different network side devices.

Optionally, the measurement parameters may also include the measurement period parameters for beam measurement and/or group identifiers of the one or more target beam groups.

Optionally, the measurement period parameters include period values, time offset values, and durations of measurements.

Optionally, an association relation is configured between the group identifiers and the reference signal resources corresponding to the one or more target beam groups. The association relation is used by the mobile terminal to determine target beam groups to be measured, based on the reference signal resources.

Optionally, the report parameters include parameters of the target beam groups. In a case that the measurement parameters include group identifiers of the target beam groups, the parameters of the target beam groups include the group identifiers of the target beam groups and receiving powers corresponding to the target beam groups. In a case that the measurement parameters do not include the group identifiers of the target beam groups, the parameters of the target beam groups include the receiving powers on the reference signal resources corresponding to the target beam groups.

Optionally, the report parameters may further include reporting period parameters and/or a timing relation between beam reporting and beam measurement, wherein the timing relation is used by the mobile terminal to perform the beam reporting after a preset time interval since the beam measurement is performed.

Optionally, the processor 2401 is configured for determining whether a reporting signaling transmitted by the network side device is received or not; if the reporting signaling transmitted by the network side device is received, reporting the measurement result according the report parameters.

Optionally, the processor 2401 is further configured for reporting a location of the mobile terminal to the network side device, wherein the location of the mobile terminal is used by the network side device to determine the target beam groups.

Optionally, the processor 2401 is further configured for receiving service data transmitted by the network side device based on the target beam group having the optimum receiving power.

Optionally, the processor 2401 is configured for, obtaining the measurement report parameters configured by the network side device based on the measurement beam groups; wherein the measurement beam groups are beam groups determined by the network side device based on the measurement result reported by the mobile terminal, and are used for RRM measurement; performing measurement of the RRM measurement based on the measurement report parameters; reporting a measurement result to the network side device, wherein the measurement result is used by the network side device to perform the handover procedure for the mobile terminal.

Optionally, the reporting of the beams is carried on a Physical Uplink Control Channel or a Medium Access Control Control Element.

Optionally, the processor 2401 is further configured for: monitoring whether a quality of a communication link of the mobile terminal deteriorates or not; in a case that the quality of the communication link of the mobile terminal deteriorates, transmitting a notification to the network side device, wherein the notification is used to inform the network side device of the quality of the communication link of the mobile terminal.

In this way, in the embodiments of the present disclosure, since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant may be addressed.

Ninth Embodiment

Figure 25:
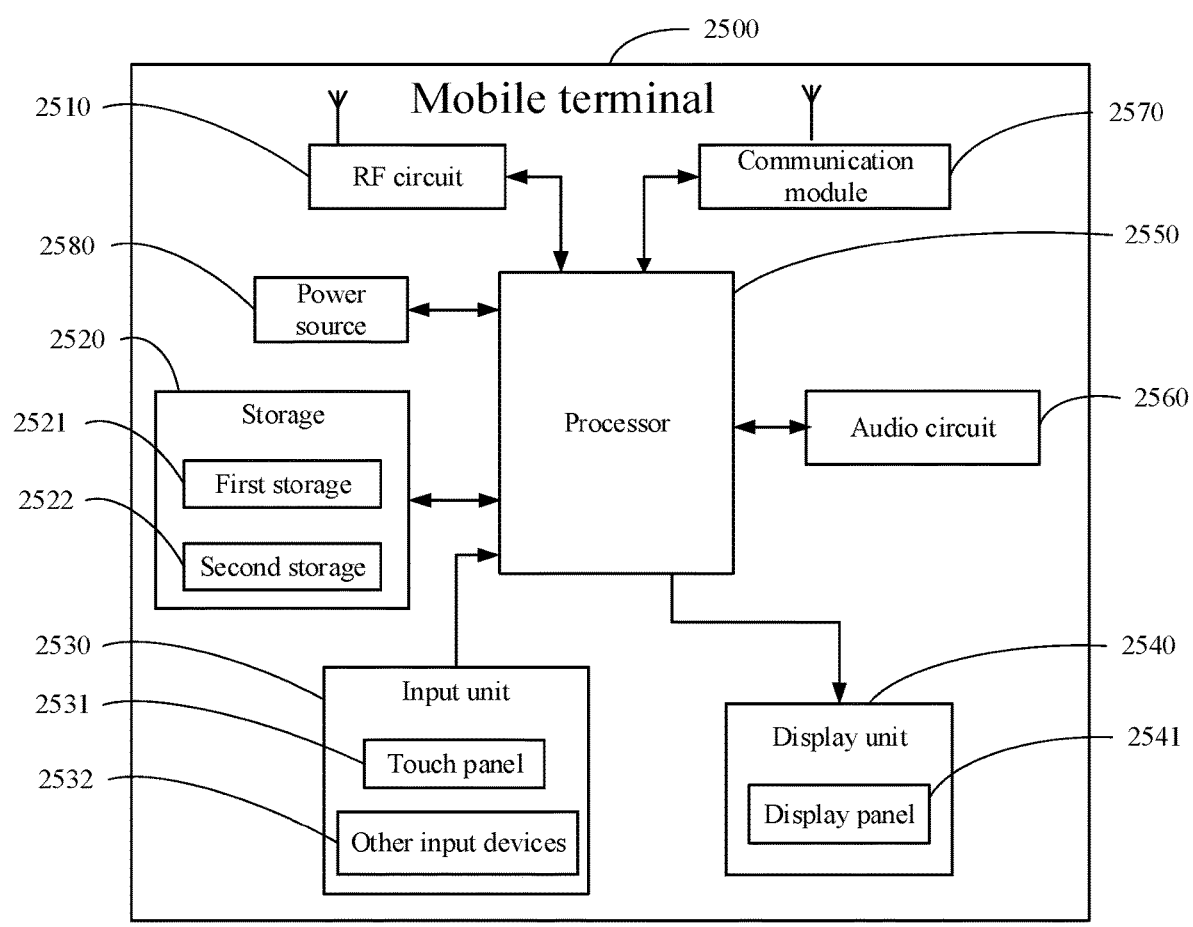
FIG. 25 is a structural schematic diagram of a mobile terminal provided in a ninth embodiment of the present disclosure.

Referring to FIG. 25, FIG. 25 is a structural diagram of a mobile terminal provided in the embodiments of the present disclosure. The mobile terminal may achieve details of the beam measurement and reporting method in the third and the fourth embodiments of the present disclosure and may achieve same technical effects. As shown in FIG. 25, the mobile terminal 2500 includes a Radio Frequency (RF) circuit 2510, a storage 2520, an input unit 2530, a display unit 2540, a processor 2550, an audio circuit 2560, a communication module 2570, and a power source 2580, and a camera (not shown).

The input unit 2530 may be configured to receive digital or symbol information inputted by a user, and generate signal inputs related with user settings or functional control of the mobile terminal 2500. Specifically, in the embodiments of the present disclosure, the input unit 2530 may include a touch panel 2531. The touch panel 2531 is also called a touch screen, may collect touch operations on the touch panel 2531 or near the touch panel 2531 from a user (such as a user uses a finger, a stylus or any other suitable articles or attachments to touch the touch panel 2531), and drive a corresponding connected device according to predetermined programs. Optionally, the touch panel 2531 may include a touch detection device and a touch controller. The touch detection device detects a touch position of a user and detects a signal from a touch operation, and transmits the signal to the touch controller; the touch controller receives touch information from the touch detection device, and transforms the touch information into touch position coordinates, and transmits the touch position coordinates to the processor 2550, and receives a command from the processor 2550 and executes the command. In addition, the touch panel 2531 may also be implemented in various types such as a resistive type, a capacitive type, an infrared-ray type or a surface acoustic-wave type. Beside the touch panel 2531, the input unit 2530 may further include other input devices 2532. The other input devices 2532 may include, but are not limited to, one or more of a physical keyboard, a functional button (such as a volume control button, a switch button, or the like), a track ball, a mouse, an operation stick, or the like.

The display unit 2540 may be used to display information inputted from a user or information provided to the user, and various menu interfaces of the mobile terminal 2500. The display unit 2540 may include a display panel 2541. Optionally, the display panel 2541 may be configured by using a Liquid Crystal Display (LCD) or an Organic Light-Emitting Diode (OLED).

It should be noted that, the touch panel 2531 may cover the display panel 2541 to form a touch display screen. When the touch display screen detects a touch operation on or near the touch display screen, the touch display screen transmits information of the touch operation to the processor 2500 to determine a type of a touch event, and thereby the processor 2550 provides a visual output corresponding to the type of the touch event on the touch display screen.

The processor 2550 is a control center of the mobile terminal 2500, and is connected to various parts of the mobile terminal through various interfaces and lines. Through executing or performing software programs and/or modules in the first storage 2521 and invoking data stored in the second storage 2522, the processor 2550 executes various functions and processes data for the mobile terminal 2550, and thereby monitors comprehensively events of the mobile terminal 2500. The processor 2550 may include one or more processing units.

In the embodiments of the present disclosure, through invoking software programs and/or modules stored in the first storage 2521 and/or data stored in the second storage 25222, the processor 2550 is further configured for receiving the measurement parameters and the report parameters corresponding to the one or more target beam groups configured by the network side device, wherein the measurement parameters include reference signal resources, and each of the one or more target beam groups includes beams of at least two Transmission-Reception Points (TRPs), and reference signal resources corresponding to different ones of the one or more target beam groups are different, and reference signal resources corresponding to beams of at least two TRPs in at least one of the one or more target beam groups are same; based on the measurement parameters and the report parameters, the measurement configuration and the reporting measurement are performed on the one or more target beam groups; based on the measurement parameters, measurement for the receiving power of the one or more target beam groups is performed; and a result of the measurement is reported based on the report parameters.

Optionally, the processor 2550 is specifically configured for receiving beams in each of the one or more target beam groups based on any one of an omnidirectional beam, a wide beam and a plurality of narrow beams; and measuring a receiving power of each of the one or more target beam groups according to reference signals corresponding to each of the one or more target beam groups.

Optionally, all beams in each of the one or more target beam groups use same reference signal resources.

Optionally, all beams of at least one of the one or more target beam groups belong to beams of at least two TRPs of a same network side device, or the all beams of at least one of the one or more target beam groups belong to beams of at least two TRPs of different network side devices.

Optionally, the measurement parameters may also include the measurement period parameters for beam measurement and/or group identifiers of the one or more target beam groups.

Optionally, the measurement period parameters include period values, time offset values, and durations of measurements.

Optionally, an association relation is configured between the group identifiers and the reference signal resources corresponding to the one or more target beam groups. The association relation is used by the mobile terminal to determine target beam groups to be measured, based on the reference signal resources.

Optionally, the report parameters include parameters of target beam groups. In a case that the measurement parameters include group identifiers of target beam groups, the parameters of the target beam groups include the group identifiers of the target beam groups and receiving powers corresponding to the target beam groups. In a case that the measurement parameters do not include the group identifiers of the target beam groups, the parameters of the target beam groups include receiving powers on reference signal resources corresponding to the target beam groups.

Optionally, the report parameters may further include reporting period parameters and/or a timing relation between beam reporting and beam measurement, wherein the timing relation is used by the mobile terminal to perform the beam reporting after a preset time interval since the beam measurement is performed.

Optionally, the processor 2501 is configured for determining whether a reporting signaling transmitted by the network side device is received or not; if the reporting signaling transmitted by the network side device is received, reporting the measurement result according the report parameters.

Optionally, the processor 2501 is further configured for reporting a location of the mobile terminal to the network side device, wherein the location of the mobile terminal is used by the network side device to determine the target beam groups.

Optionally, the processor 2501 is further configured for receiving service data transmitted by the network side device according to a target beam group having an optimum receiving power.

Optionally, the processor 2501 is configured for, obtaining measurement report parameters configured by the network side device based on the measurement beam groups; wherein the measurement beam groups are beam groups determined by the network side device according to a measurement result reported by the mobile terminal, and are used for Radio Resource Management (RRM) measurement; performing measurement of the RRM measurement based on the measurement report parameters; reporting a measurement result to the network side device, wherein the measurement result is used by the network side device to perform the hand-over procedure for the mobile terminal.

Optionally, the reporting of the beams is carried on a Physical Uplink Control Channel or a Medium Access Control Control Element.

Optionally, the processor 2401 is further configured for: monitoring whether a quality of a communication link of the mobile terminal deteriorates or not; in a case that the quality of the communication link of the mobile terminal deteriorates, transmitting a notification to the network side device, wherein the notification is used to inform the network side device of the quality of the communication link of the mobile terminal.

In this way, in the embodiments of the present disclosure, since the beams to be measured are grouped and configured, and at least two reference signal resources in at least one of the one or more target beam groups are same, a quantity of reference signal resources allocated in a beam-training procedure may be reduced, and a system overhead may be reduced, and a problem that the system overhead is large and the quantity of reference signal resources allocated in the beam-training procedure is significant may be addressed.

It may be understood by one of ordinary skills in the art, modules, algorithms, or steps described in the embodiments of present disclosure may be implemented by electronic hardware, computer software or a combination of the computer software and the electronic hardware. Whether the implementation is through the electronic hardware or through the computer software is determined by a specific application scenario and design constraints of technical solutions. Those skilled in the art may use different methods to implement described modules or steps according to a specific application scenario, and such implementation does not go beyond the scope of the present disclosure.

One of ordinary skills in the art may clearly understand that, for sake of easy and brief description, a specific operation flow in the above-identified system, device and units may be obtained by referring to corresponding processes in the above process embodiments, and will not be repeated.

It should be understood that, in the several embodiments provided in the present disclosure, the disclosed device and method can be implemented in other ways. The apparatus embodiments described above are only illustrative. For example, a division of units may be only one logically functional division. There may be other divisions in actual implementations, e.g, multiple units and components can be combined or integrated in another system, or some features may be omitted or not executed. Additionally, couplings, or direct couplings, or communication connections between displayed or discussed components may be indirect couplings or communication connections between devices or units via some interfaces, and may be electrical, mechanical or other forms of connections.

Modules or submodules described as separated parts may be integral or physically separated, parts displayed as modules may be or may not be physical units, may be located in a same place or be dispersed at multiple network units. Some or all of the modules described above may be used to implement the technical solution of the present disclosure according to actual requirements.

The functional units described in the embodiments of the present disclosure may be integrated in one processing unit or may be separated physically, or two or more of the units may be integrated in one unit.

The above functions of the present disclosure may be stored in a computer readable storage medium if they are implemented in forms of software functional modules or are sold or used as separate products. Based on such understandings, essentials of technical solutions of the embodiments of the present disclosure or parts that the present disclosure contributes to relevant techniques, or a part of the technical solutions may be embodied in computer software products. The computer software products are stored in a storage medium including instructions for causing a computing device (which may be a personal computer, a server, a network device or the like) to perform some or parts of the method of the embodiments of the present disclosure. The above storage medium may include various medium capable of storing programs and codes such as a flash disk, a removable storage device, a ROM, a RAM, a magnetic disk or a compact disk.

The above descriptions are only specific embodiments of the present disclosure. However, the protection scope of the present disclosure is not limited thereto. Any variations or replacements anticipated by those skilled in the art in the technical scope disclosed by the present disclosure will fall into the protection scope of the present disclosure. Thus, the protection scope of the present disclosure should be determined by the claims.

The invention claimed is:

1. A non-transitory computer readable storage medium, comprising:
  computer programs stored on the computer readable storage medium, wherein in a case that the computer programs are executed by a processor, the processor causes a network side device to perform a beam measurement and reporting method, the method comprises:
  configuring measurement parameters and report parameters corresponding to one or more target beam groups, wherein, the measurement parameters comprise reference signal resources, each of the one or more target beam groups comprises beams of at least two Transmission-Reception Points (TRPs), reference signal resources corresponding to different ones of the one or more target beam groups are different, and reference signal resources corresponding to beams of at least two TRPs in at least one of the one or more target beam groups are same;
  transmitting the measurement parameters and the report parameters to a mobile terminal, wherein the measurement parameters are used for the mobile terminal to perform measurement configuration, and the report parameters are used for the mobile terminal to perform report configuration;
  controlling beams of the one or more target beam groups to transmit reference signals on reference signal resources corresponding to the beams, wherein the reference signals are used by the mobile terminal to perform beam measurement;
  receiving a measurement report comprising measurement results reported by the mobile terminal based on the report parameters.

2. The non-transitory computer readable storage medium according to claim 1, wherein, in a case that the computer programs are executed by a processor, the processor further causes the network side device to perform: before the controlling beams of the one or more target beam groups to transmit reference signals on reference signal resources corresponding to the beams,
  determining whether a preset beam measurement condition is met or not;
  in a case that the preset beam measurement condition is met, controlling beams of the one or more target beam groups to transmit reference signals on reference signal resources corresponding to the beams;
  wherein, the preset beam measurement condition comprises at least one of: a condition that a quality deterioration of a communication link of the mobile terminal is monitored by the network side device, a condition that a notification transmitted by the mobile terminal in case of the quality deterioration of the communication link of the mobile terminal monitored by the mobile terminal is received, or a condition that a current time reaches a preset beam measurement period.

3. The non-transitory computer readable storage medium according to claim 1, wherein, same reference signal resources are used for all beams in each of the one or more target beam groups.

4. The non-transitory computer readable storage medium according to claim 1, wherein, all beams of the one or more target beam groups belong to beams of at least two TRPs of a same network side device, or the all beams of the one or more target beam groups belong to beams of at least two TRPs of different network side devices.

5. The non-transitory computer readable storage medium according to claim 1, wherein, the measurement parameters further comprise measurement period parameters for the beam measurement and/or group identifiers of the one or more target beam groups.

6. The non-transitory computer readable storage medium according to claim 5, wherein, the measurement period parameters comprise period values, time offset values, and durations of measurements; and/or
  an association relation is configured between the group identifiers and the reference signal resources corresponding to the one or more target beam groups, and is used by the mobile terminal to determine a target beam group to be measured, based on the reference signal resources.

7. The non-transitory computer readable storage medium according to claim 6, wherein, the report parameters comprise parameters of the target beam group;
  in a case that the measurement parameters comprise a group identifier of the target beam group, the parameters of the target beam group comprise the group identifier of the target beam group and a receiving power corresponding to the target beam group;
  in a case that the measurement parameters do not comprise the group identifier of the target beam group, the parameters of the target beam group comprise the receiving powers on reference signal resources corresponding to the target beam group.

8. The non-transitory computer readable storage medium according to claim 7, wherein, the report parameters further comprise reporting period parameters and/or a timing relation between beam reporting and the beam measurement, wherein the timing relation is used by the mobile terminal to perform the beam reporting after a preset time interval since the beam measurement is performed.

9. The non-transitory computer readable storage medium according to claim 1, wherein, in a case that the computer programs are executed by a processor, the processor further causes the network side device to perform:
  before configuring the measurement parameters and the report parameters corresponding to one or more target beam groups,
    obtaining a location of the mobile terminal;

grouping first beams and second beams to obtain the one or more target beam groups, wherein the first beams are beams pointing to the location of the mobile terminal from at least one TRP, and the second beams are beams adjacent to directions directed by the first beams;

or, before configuring the measurement parameters and the report parameters corresponding to one or more target beam groups, dividing a public coverage area of TRPs, and configuring different beam groups to cover different sub-regions of the public coverage area;

determining a first sub-region in which the mobile terminal is located, and second sub-regions adjacent to the first sub-region;

setting beam groups corresponding to the first sub-region and the second sub-regions as the one or more target beam groups;

or, before configuring the measurement parameters and the report parameters corresponding to one or more target beam groups, dividing a public coverage area of TRPs, and configuring different beam groups to cover different sub-regions of the public coverage area;

grouping the sub-regions and obtaining at least two region groups, and setting beam groups corresponding to all sub-regions in the public coverage area as the one or more target beam groups, wherein each of the region groups comprises at least one sub-region;

the controlling beams of the one or more target beam groups to transmit reference signals on reference signal resources corresponding to the beams, comprises:

performing beam-training to different ones of the region groups in a time-division manner, so as to control beams of all target beam groups in each of the region groups to transmit reference signals on reference signal resources corresponding to the beams simultaneously.

10. The non-transitory computer readable storage medium according to claim 1, wherein, in a case that the computer programs are executed by a processor, the processor further causes the network side device to perform:

after the receiving a measurement report comprising measurement results reported by the mobile terminal based on the report parameters, determining a target beam group having an optimum receiving power based on the measurement report;

controlling service data of the mobile terminal to be transmitted through the target beam group having the optimum receiving power;

or after the receiving a measurement report comprising measurement results reported by the mobile terminal based on the report parameters, determining a measurement beam group for the mobile terminal based on the measurement report, wherein the measurement beam group is a beam group for the mobile terminal to perform a Radio Resource Management (RRM) measurement;

based on the measurement beam group, configuring measurement report parameters for the mobile terminal to perform the RRM measurement;

receiving measurement result of the RRM measurement performed by the mobile terminal based on the measurement report parameters;

performing a handover procedure to the mobile terminal based on the measurement result.

11. A non-transitory computer readable storage medium, comprising:

computer programs stored on the computer readable storage medium, wherein in a case that the computer programs are executed by a processor, the processor causes a mobile terminal to perform a beam measurement and reporting method, the method comprises:

receiving measurement parameters and report parameters corresponding to one or more target beam groups configured by a network side device, wherein the measurement parameters comprise reference signal resources, each of the one or more target beam groups comprises beams of at least two Transmission-Reception Points (TRPs), reference signal resources corresponding to different ones of the one or more target beam groups are different, and reference signal resources corresponding to beams of at least two TRPs in at least one of the one or more target beam groups are same;

performing measurement configuration and report configuration to the one or more target beam groups based on the measurement parameters and the report parameters;

measuring receiving powers of the one or more target beam groups based on the measurement parameters;

reporting measurement results based on the report parameters.

12. The non-transitory computer readable storage medium according to claim 11, wherein, same reference signal resources are used for all beams in each of the one or more target beam groups; and/or all beams of the one or more target beam groups belong to beams of at least two TRPs of a same network side device, or the all beams of the one or more target beam groups belong to beams of at least two TRPs of different network side devices; and/or the measuring receiving powers of the one or more target beam groups based on the measurement parameters, comprises:

receiving beams in each of the one or more target beam groups based on any one of an omnidirectional beam, a wide beam and a plurality of narrow beams; and measuring receiving powers of each of the one or more target beam groups according to reference signals corresponding to each of the one or more target beam groups.

13. The non-transitory computer readable storage medium according to claim 11, wherein, the measurement parameters further comprise measurement period parameters for the beam measurement and/or group identifiers of the one or more target beam groups.

14. The non-transitory computer readable storage medium according to claim 13, wherein, the measurement period parameters comprise period values, time offset values, and durations of measurements; and/or an association relation is configured between the group identifiers and the reference signal resources corresponding to the one or more target beam groups, and is used by the mobile terminal to determine a target beam group to be measured, based on the reference signal resources.

15. The non-transitory computer readable storage medium according to claim 14, wherein, the report parameters comprise parameters of the target beam group;

in a case that the measurement parameters comprise a group identifier of the target beam group, the parameters of the target beam group comprise the group identifier of the target beam group and a receiving power corresponding to the target beam group;

in a case that the measurement parameters do not comprise the group identifier of the target beam group, the parameters of the target beam group comprise the receiving powers on reference signal resources corresponding to the target beam group.

16. The non-transitory computer readable storage medium according to claim 15, wherein, the report parameters further comprise reporting period parameters and/or a timing relation between beam reporting and the beam measurement, wherein the timing relation is used by the mobile terminal to perform the beam reporting after a preset time interval since the beam measurement is performed.

17. The non-transitory computer readable storage medium according to claim 11, wherein, in a case that the computer programs are executed by a processor, the processor further causes the mobile terminal to perform:

before the reporting measurement results based on the report parameters,
determining whether a reporting signaling transmitted by the network side device is received or not;
in a case that the reporting signaling is received, reporting measurement results based on the report parameters;

and/or
one of following (1) or (2):
(1) after the reporting measurement results based on the report parameters,
receiving service data transmitted by the network side device according to a target beam group having an optimum receiving power; or
(2) after the reporting measurement results based on the report parameters,
obtaining measurement report parameters configured by the network side device based on measurement beam groups; wherein the measurement beam groups are beam groups determined by the network side device based on the measurement results reported by the mobile terminal, and are used for Radio Resource Management (RRM) measurement;
performing measurement of the RRM measurement based on the measurement report parameters;
reporting measurement result to the network side device, wherein the measurement result is used by the network side device to perform a hand-over procedure for the mobile terminal.

18. The non-transitory computer readable storage medium according to claim 11, wherein, in a case that the computer programs are executed by a processor, the processor further causes the mobile terminal to perform:

before the receiving measurement parameters and report parameters corresponding to one or more target beam groups configured by a network side device,
reporting a location of the mobile terminal to the network side device, wherein the location of the mobile terminal is used by the network side device to determine the one or more target beam groups; or
before the receiving measurement parameters and report parameters corresponding to one or more target beam groups configured by a network side device,
monitoring whether a quality of a communication link of the mobile terminal deteriorates or not;
in a case that the quality of the communication link of the mobile terminal deteriorates, transmitting a notification to the network side device, wherein the notification is used to inform the network side device of the quality of the communication link of the mobile terminal.

\* \* \* \* \*